United States Patent [19]

Carver

[11] 4,457,012

[45] Jun. 26, 1984

[54] FM STEREO APPARATUS AND METHOD

[76] Inventor: Robert W. Carver, 330 Ave. A, Snohomish, Wash. 98290

[21] Appl. No.: 384,526

[22] Filed: Jun. 3, 1982

[51] Int. Cl.³ .............................................. H04H 5/00
[52] U.S. Cl. ......................................... 381/3; 381/10; 381/13
[58] Field of Search ............................... 381/3, 10, 13

[56] References Cited

U.S. PATENT DOCUMENTS 4,154,980  5/1979  Schmidt et al. ......................... 381/13
4,221,928  9/1980  Franssen et al. ................... 381/13 X
4,379,207  4/1983  Kubota .............................. 381/13 X Primary Examiner—R. J. Hickey
Attorney, Agent, or Firm—Hughes, Barnard & Cassidy

[57] ABSTRACT

An output matrix adapted to receive an L+R signal component (made up of the sum of L and R stereo components) and an L-R signal component, and to combine these in a manner to produce a separate L output and a separate R output, with certain modifications to the outputs. The higher frequency portion of the L-R signal is passed through a detector which, in turn, causes a leading edge amplifier to transmit to the matrix only those signal portions where there is a relatively abrupt change of amplitude, these being the signal portions which contain the main stereo information which gives the directional information. Also, the L+R signal component, in addition to being transmitted directly to the matrix, is directed through time delay means to produce a time delayed L+R signal component that is also transmitted to the matrix, so as to provide what are called "ambient" to the output of the matrix.

97 Claims, 12 Drawing Figures

FM STEREO APPARATUS AND METHOD

BACKGROUND OF THE INVENTION

The present invention relates to FM stereo, and more particularly to a method and apparatus for reproducing FM stereo sounds in a manner to reduce noise and distortion, while preserving the quality of the reproduced stereo sounds.

It is well known that when FM radio transmission is reproduced in the mono mode, there is a relatively high quality of sound reproduction, with little background noise and relatively little distortion. However, it is also well known that when there is FM transmission of a stereo signal, there is much greater noise and distortion. More specifically the L−R sound is quite susceptible to multipath distortion. This occurs when the FM signal is reflected off the side of a building, hill, or even by a bridge, so that there is a second or third delayed signal reaching the receiver. When these delayed signals are superimposed on the main signal transmitted directly to the receiver, there is distortion in the combined signal that is reproduced.

The common method of producing FM stereo is to transmit an L+R signal (which is a combination of the left stereo signal and the right stereo signal) as a frequency modulation on the radio frequency carrier, which, when demodulated, has signals in the band from 0 to 15 kHz. There is also an L−R signal component (which is the difference between the left stereo signal and the right stereo signal), and this is transmitted in a band width which is centered on a 38th kHz subcarrier, with the range of this band being from about 23 kHz to 53 kHz. These two sets of signals are separated in the receiver, then fed to a decoding matrix which combines these signals so as to provide separate L and R outputs that correspond to the original left and right stereo signals, and are in turn fed to left and right speakers to produce the stereo sound.

The L+R signal is, of itself, of high quality, while most of the random noise and multipath distortion is attributable to the L−R signal. There have been attempts in the prior art to somehow mask or eliminate the random noise and distortion in the L−R signal. It has been recognized in the prior art that most of the undesirable noise and distortion is present in the higher frequency range of the L−R signal, and for this reason, one approach has been to mute the high frequency part of the L−R signal component, particularly where there is low signal strength so that the noise and distortion is more noticeable. Such an approach is disclosed in U.S. Pat. No. 3,943,293, Bailey. However, by so muting or eliminating the L−R information, much of the stereo effect is lost, with the L+R signal being transmitted from both speakers so that, in effect, there is produced a more mono-like sound rather than a full stereo sound.

The overall effect is that when the music is playing loudly, the sound moves out to the speakers for the stereo effect. However, when the music begins to be less loud, it moves from the location of the speakers to a center location. Likewise, when a single instrument is playing loudly, it appears to come from the speaker location, but then move to a location between the speakers when that same instrument is playing more softly.

Another consideration is that many of the prior art approaches have failed to recognize the significance or role of what might be termed the "ambient" sounds in a stereo recording. The quality of a stereo recording is affected by sounds which are reflected at the recording location and then picked up by the recording microphones. While these sounds may or may not be directional, when added to the main musical sound, they produce a certain fullness of the sound which is more representative of a live performance. Such reflected or delayed sounds are the "ambient" sounds referred to above.

In view of the above, it is an object of the present invention to reproduce FM stereo sound in a manner to minimize random noise and distortion, while preserving the directional information and fullness of the original stereo signal.

SUMMARY OF THE INVENTION

The apparatus of the present invention provides an improved FM stereo output, where there is an L+R signal component corresponding with the sum of an L signal and an R signal, and an L−R signal component corresponding to the difference of the L signal and the R signal. The apparatus comprises an input means to provide an input signal made up of the L+R signal component and the L−R signal component. There is output means including matrix means to receive and combine said signal components at respective sufficiently high levels to produce a first output mode where there is a first output component corresponding more to said L signal and a second output component corresponding more to said R signal so as to be able to provide directional information, and to receive at least said L+R signal at a sufficiently greater level than said L−R signal to produce a second output mode where said first and second output components both correspond more closely to said L+R component.

Further, there is control means, including detector means, to detect from said signal first signal portions where there is a more abrupt change of amplitude and to transmit the L−R signal components of the first signal portions at said sufficiently high levels to produce the first output mode, and during second signal portions other than said first signal portions to diminish the L−R signal component relative to the L+R signal component to produce the second output mode. Also, there is time delay means adapted to receive the L+R signal component and to provide a delayed L+R signal input to the output means, so as in turn to produce a delayed L+R output from the output means.

Preferably, the control means is arranged to diminish primarily a higher frequency portion of the L−R signal component during said second signal portions. Specifically, the control means can comprise a low pass filter to transmit a low frequency portion of the L−R component, independently of the detector means. More specifically, the control means comprises an amplifier means to receive the L−R signal component and to transmit the L−R signal component to the matrix means. The detector means is responsive to the abrupt change of amplitude to cause the amplifier means to transmit the L−R signal component at a higher level in response to the detector means detecting the abrupt changes of amplitude.

As another feature, there can be provided noise control means which is connected to the matrix in parallel with the amplifier means to transmit the L−R signal component to the matrix means. The noise control means has selectively operable switch means to diminish the L−R signal component delivered by the noise control means so as to be able to diminish noise contributed by the L−R signal component.

In one form, the detector means is responsive primarily to increases in amplitude of a signal. In another form, the detector means is responsive to both abrupt increases and decreases in the amplitude of the signal.

In the preferred form, the time delay means comprises a first time delay device to produce a first delayed L+R signal input of a shorter delay and a second time delay device to produce a second delayed L+R signal input of a greater delay. The control means further comprises time delay control means to control amplitude of the delayed L+R signal input in accordance with relative signal strength of the L−R signal component in comparison to the L+R signal component.

The time delay means is arranged so that one of the time delay devices produces its time delay input at a higher frequency range of the L+R signal component, and the other time delay device produces delayed input at a lower frequency portion of the L+R input. Specifically, the first time delay device produces the shorter time delay input at the higher frequency, and the second time delay device produces the longer delay input at the lower frequency.

Preferably, there is filter means to receive the delayed input from the time delay means and to diminish a middle frequency portion of the time delayed input relative to low and high frequency portions thereof, so as to provide a modified input which is transmitted to the output means.

To control amplitude of the delayed input, there is a comparator which comprises first and second means to receive first and second input values related, respectively, to the L+R signal component and the L−R signal component, so as to produce first and second output values related to the log of the respective input value. The first and second output values are subtracted from one another by third means to produce a third output value related to actual value of the ratio of the first and second input values. There is fourth means to direct the third output to the time delay control means to increase or decrease amplitude of the delayed input.

In the preferred form, control logic means is provided to cause the output means to be selectively responsive to the control means. The logic means comprises a signal strength indicator means responsive to a value related to the input signal in a manner to determine low signal strength condition where signal strength is below a predetermined signal value. Also, there is multipath distortion indicating means responsive to variations in a value relating to the input signal to indicate a multipath distortion condition where multipath distortion is above a predetermined multipath distortion level. There is logic means responsive to the signal strength indicator and the multipath distortion indicator to cause the output means to be responsive to either the low signal strength condition or the multipath distortion condition.

Desirably, the control logic means further comprises a time logic circuit to initiate a predetermined examination time period during which the signal strength indicating means and the multipath distortion indicating means become operative. Also, the logic circuit means desirable includes muting means to cause the output of the apparatus to become mute during the examination time period. Also, the logic circuit means is responsive to station change indicating means of the apparatus, in a manner to initiate the examination period where there is a change of station input to the apparatus.

Further, in the preferred form, there is a muting signal input means responsive to a muting signal of the apparatus to cause the time logic circuit to initiate the examination period to cause operation of the signal strength indicator and the multipath distortion indicator.

Trigger switch means is provided to initiate the examination period in response to initial operation of the control means. Also, the trigger switch means can be made responsive to deactivation of the control means to cause the time logic circuit means to mute the sound output for a time period after the control means is deactivated, and before L and R signals are transmitted directly from the output means.

In the specific embodiment shown herein, the detector means comprises capacitor means to receive a value related to the L−R signal component and to transmit a differentiated signal related to rate of change of the L−R signal component. There is signal control means responsive to the differentiated signal to produce a control signal. Also, there is L−R variable transmitting means adapted to transmit the L−R signal component to the output means at a variable output level. This transmitting means is responsive to the control signal to transmit the L−R signal component at a greater or lesser level depending on magnitude of the differentiated output from the capacitor means.

More specifically, the detector means comprises rectifying means to receive the L−R signal and produce a rectified L−R signal value. There is amplifier means to receive the rectified value to produce the value related to the L−R signal component. Further, there is means providing a circuit path from the amplifier to the signal control means to transmit thereto a value related to absolute magnitude of the L−R signal component.

In another embodiment, there are steering diodes positioned between the capacitor means and the L−R signal control means in a manner to make the L−R signal control means responsive to both increases and decreases in magnitude of the differentiated signal.

In the method of the present invention there is the step of providing the input signal as described above, then detecting from the signal first signal portions where there is a more abrupt change of amplitude. During the first signal portions, there is the step of receiving and combining the signal components at the respectively sufficiently high levels to produce the first output mode, and to produce the second output mode during the second signal portions. The more specific features of the method of the present invention correspond to the operations preformed by the above described apparatus, so these will not be repeated herein.

Other features of the invention will become apparent from the following detailed description.

BRIEF DESCRIPTION OF THE DRAWINGS

FIG. 8-A is a circuit diagram of a portion of the leading edge detector showing a modified form thereof;

DESCRIPTION OF THE PREFERRED EMBODIMENT

Figure 1:
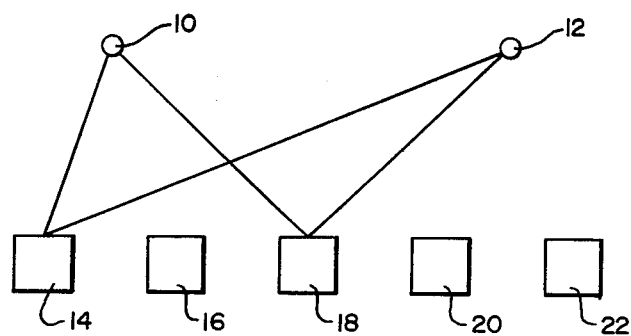
FIG. 1 is a schematic view illustrating the manner in which stereo recordings are typically made.

It is believed that a clear understanding of the novel features of the present invention will be obtained by first describing in general how stereo recordings are made and also certain phenomena of stereo sound. The general manner in which a stereo recording is made will now be explained with reference to FIG. 1.

A quite common method of making a stereo recording is to provide two microphones 10 and 12 at a spaced distance from one another. The sound sources (i.e. musical instruments, human voices, drums, etc.) are positioned at various locations in front of the microphones 10 and 12, and five such sound sources are indicated schematically at 14, 16, 18, 20, and 22. The sound source 18 is equally distant from the two microphones 10 and 12, so that the sound from source 18 would be received at the same time and at the same intensity at each microphone 10 and 12. Thus when the signals corresponding to the sound from the source 18 are reproduced in stereo speakers, substantially the same sound is reproduced at the same time at the speakers. Thus, the sound from the source 18 would more resemble a mono sound and would appear to be coming from a location intermediate the two speaker locations.

On the other hand, when a sound is produced from a source which is much nearer to one microphone than to the other, the sound is recorded quite differently at each microphone. For example, the sound from the souce 14 is received at an earlier time and at a higher intensity at microphone 10 than it is at the microphone 12. When the recorded signals are reproduced in stereo at two speakers, there is first produced a louder sound from one speaker (corresponding to the sound received by microphone 10) and a short instant later a softer similar sound emanating from the other speaker (this corresponding to the sound received at the microphone 12). This sort of sound has much more of the directional character that is associated with stereo. It is a combination of these sounds, some appearing to be emanating from both speakers, and others as a separate sound from each speaker, that produce the overall stereo effect.

In addition, there are those sounds which have been identified earlier as "ambient" sounds. These are the sounds which are reflected from walls or other objects at the location of recording and then picked up by the microphones. When these reflected sounds are reproduced in the speakers, they add something of the effect of echoes or reflected sounds that might be heard as live music in a room or music hall. These ambient sounds generally do not contain very much of the directional information of the stereo signal. Rather, they are reproduced in the form of a general echo or background sound which exists generally in the vicinity of the sound source.

Further, to appreciate the novel features of the present invention, it is necessary to examine how the directional information from a sound is detected. By way of example, let it be assumed that a sound is heard by a person at a location which is forward of the person and to the left side of the person. Since the source of the sound is nearer to the person's left ear, the sound wave first reaches the left ear, and an instant later the same sound reaches the right ear. The person's hearing mechanism is sensitive to this very short delay in recognizing the same sound reaching the person's ears and the person's brain translates this into directional information as to the source of the sound. However, it should be recognized that it is the initial sound wave (i.e. the "leading edge" of the sound wave) which provides the directional information.

To illustrate this further, let it be assumed that a person walks into a room where there is a constant humming sound. As the person opens the door to the room, this sound becomes audible. Since this is a constant sound, with no "leading edge", it contains no directional information. About the only way that the person can determine the source of the sound is by moving to different locations and detecting differences in amplitude of the sound. When the person finally reaches the location where the amplitude is greatest, the person can be assumed to be nearest to the sound source.

However, let us assume that instead of the sound being a constant hum, it is a "beeping" sound which goes on and off. The person can quickly detect the initiation or "leading edge" of each beep, and this directional information can immediately be translated into information indicating the source of the sound.

Also, the interruption of a sound contains directional information. When a sound abruptly terminates, the ear nearer the sound source will detect the absence of sound sooner than the other ear. This information is translated in the person's brain as directional information and helps identify the location of the sound source.

With the foregoing in mind, let us know turn our attention to the conventional manner in which FM stereo signals are transmitted, received and reproduced as audible sounds. For historical reasons in the development in FM broadcasting (the complexities of which are beyond the scope of this brief introduction), FM stereo signals are commonly not transmitted as a pure left stereo signal and a pure right stereo signal. Rather, there is a first signal component which is an L+R signal component (a combination of the left stereo signal and the right stereo signal). This signal component is transmitted at a lower frequency (i.e. below 15 kHz). Then there is a second stereo component which is an L−R component (i.e. a component which is the difference of the left stereo signal and the right stereo signal). This signal component is transmitted at a higher frequency (i.e. at a frequency centering at the 38 kHz frequency). When the two signal components are received, translated into audio signals, and then properly combined in a matrix, (or in some instances recovered directly by syncronous switching phase locked to a 19 kHz synchronizing piolt signal) there is reproduced the L signal (corresponding to the left stereo signal) and the R signal (corresponding to the right stereo signal). This is accomplished by first combining the L+R component with the L−R component, so that the R portions cancel out, and we are left with a two L signal which is transmitted through one speaker. Then the L+R component is combined with an inverted L−R component (i.e. an R−L component) to produce a two R signal which is then transmitted through the right speaker.

Let us now examine the type of information which is stored in the L+R component and the L−R component. The L+R component carries the monophonic information, while the L−R component carries the spatial information. The spatial information can be further broken down into two sub components. First there is the localizing information which identifies the sound as coming from one speaker or the other. Second, there is the ambient information which, as indicated earlier, relates to the sounds which are reflected from walls or other objects at the location of recording and then picked up by the microphones. It can be stated as a generalization that a very large portion of the information in the L−R component (possibly as much as 85%) is ambient information that is redundant in that it is also contained in the L+R component. In view of this, the approach which has been taken in the apparatus and the method of the present invention is to recognize this redundancy and utilize from the L−R component mainly that information which is necessary to recreate the directional information of the stereo effect. As to the information in the L−R signal which can be considered generally redundant in the L+R component, the approach is to refrain from obtaining this information from the L−R component. Rather, this information is reconstructed from the L+R component in a form which is relatively free from noise and distortion.

Figure 2:
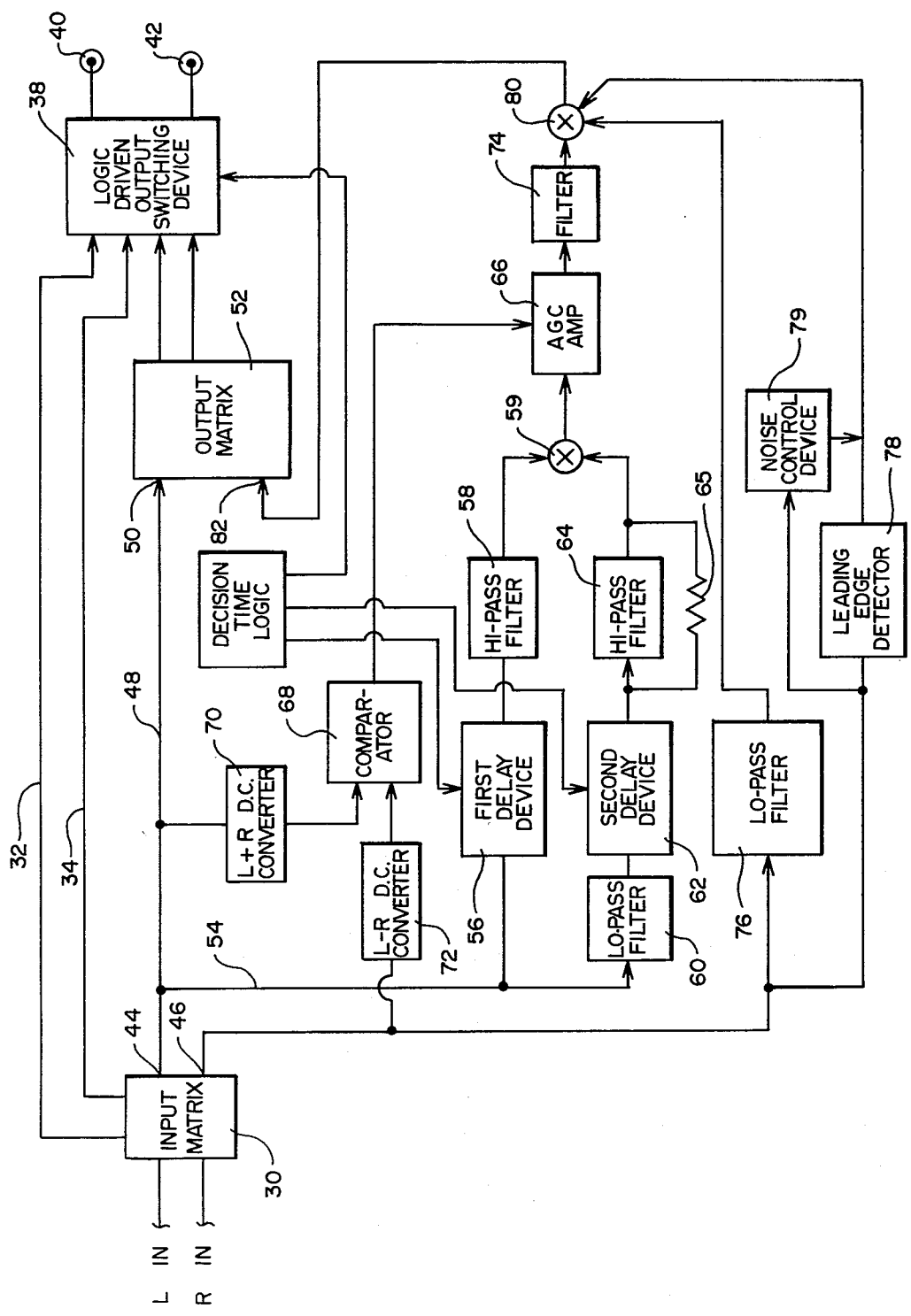
FIG. 2 is a block diagram showing the main operating components of the present invention.

With the foregoing in mind, reference is now made to FIG. 2 which is a block diagram of the main components of the present invention. It is assumed that the FM stereo information has been transmitted as an L+R component and an L−R component, that these two components have been received by an FM tuner, and that the FM tuner has translated these into audio signals and then combined these in a suitable matrix to produce the L and R signal outputs. These L and R stereo outputs could be transmitted directly to left and right speakers to reproduce stereo music. If the FM stereo station has a rather strong signal and is reasonably free of multipath distortion, high quality stereo music can be reproduced from these signals as is. However, if the signal is weak or if there is substantial multipath distortion, the L−R component would have been degraded, and this would reappear in the L and R output signals which are reproduced. Thus, the apparatus which is shown in FIG. 2 can be added on to a conventional FM stereo receiver, to take the output of that receiver and produce improved L and R output signals. However, it is to be understood that the present invention could be made to utilize the L+R and L−R signal components as originally received.

As shown in FIG. 2, there is an input matrix 30 which receives the L and R stereo signals produced from the conventional FM stereo receiver. This input matrix 30 transmits the L and R signals through lines 32 and 34 respectively to a logic driven output switching device 38 which will be described in more detail later herein. Also there is a decision time logic device 36 which examines control voltages with the tuner to determine: (a) if the strength of the signal is above a certain minimum level, and (b) if the multipath distortion of the signal is below a predetermined level. If both of these conditions exist, then the L and R signals are transmitted without further processing directly to the logic drive output switching device 38, which in turn transmits the signals directly to the left output 40 and the right output 42. In other words, since the L and R signals already have sufficiently high quality, they're simply transmitted to the output terminals 40 and 42 without any further treatment. However, if the signals are too weak, or if there is too much multipath distortion, the decision time logic device 36 senses this and brings into play the main operating components of the present invention, which will now be described below.

The input matrix 30 also functions to combine the two L and R signals to provide an L+R signal component at the output terminal 44, and the matrix 30 also functions to subtract the left and right components to provide an L−R component at the output terminal 46. The L+R component is transmitted through line 48 to an input terminal 50 of an output matrix 52.

The L+R signal is also transmitted from the terminal 44 through a line 54 to a first delay device 56. The device 56 delays the signal by a relatively short increment of time (in the specific embodiment shown herein, about 11 milliseconds), and transmits the delayed signal to a high pass filter 58 which in turn passes only those components of the signal higher than 3 kHz to a summing junction 59.

The L+R signal from the terminal 44 also is directed through the line 54 to a low pass filter 60 which passes through only those portions of the signal which are below 3 kHz. The output from the filter 60 is directed to a second time delay device 62 which provides a relatively long delay (in the specific embodiment shown herein a delay of approximately 26 milliseconds). The delayed output from the device 62 is then transmitted to a high pass filter 64 which passes only those components of the signal which are above approximately 480 Hz. However, the delayed output from the device 62 is also transmitted through a resistor 65 which is in parallel with the filter 64, so that the low frequency portion of the delayed L+R signal is transmitted to the summing junction at a lower amplitude. Thus, the signal which is transmitted from the high pass filter 64 is delayed by about 26 milliseconds, and has a frequency range between approximately 480 Hz and 3,000 Hz. This signal is transmitted to the summing junction 59.

The combined signal from the junction 59 is transmitted to an automatic gain control amplifier 66. The function of this amplifier 66 is to make the output from the junction 59 either weaker or stronger, depending upon the magnitude of the ratio of the L−R component to the L+R component. At this point of the description, it may be helpful to pause and examine the general purpose of the components described immediately above as they relate to the recreation of the L and R stereo signals to provide high quality music. It will be recalled that in the discussion contained earlier herein, it was stated that much of the information in the L−R channel is redundant in the L+R channel. It has been found that a substantial portion of this redundant information can be in a sense recreated quite advantageously by taking the L+R signal, delaying the signal, and reintroducing the signal into the output matrix 52. However, it is necessary to control the amplitude of the delayed L+R signal so that it corresponds to the strength of the L−R component. For this reason, the delayed signals from the summing junction 59 are passed through the AGC amplifier 66.

To control the amplifier 66, there is provided a comparator circuit 68, which provides an output which is proportional to the ratio of the L−R component to the L+R component. To accomplish this, there are two inputs to the comparator 68, namely an output from an L+R DC converter 70 and an L−R DC converter 72. As its name implies, the converter 70 receives the L+R output component from the terminal 44 and converts this to a DC signal transmitted to the logarithm/antilogarithm comparator 68. The L−R DC converter 72 receives the L−R signal component from the output terminal 46 of the matrix 40 and transmits a corresponding DC component to the comparator 68. This comparator 68 is or can be of conventional design, and this will be described later herein. As indicated previously, the output from the comparator 68 determines the strength of the signal transmitted from the summing junction 59. If the L−R component is relatively strong compared to the L+R component, the amplifier 66 will amplify the output from the summing junction 59 to a higher degree. The opposite is true if the ratio output from the comparator 68 is higher.

Figure 3:
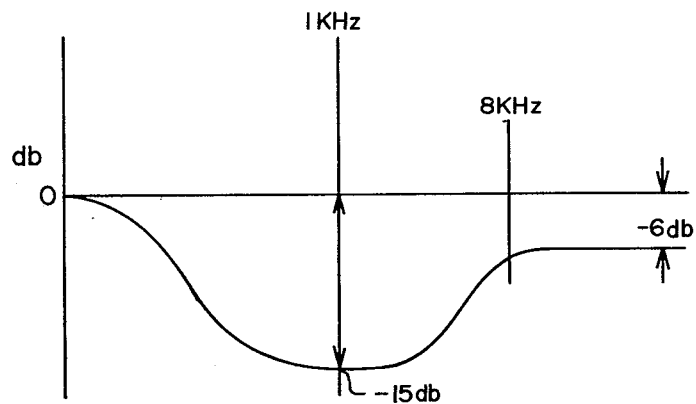
FIG. 3 is a graph illustrating the spectral shape of the fielder for the L+R time delay device of the present invention.

The output from the amplifier 66 is then directed to a low Q band stop filter 74 which is or may be of conventional design. This filter 74 functions to shape the output from the amplifier 66 to cause it to match more closely the spectral shape of the L−R component. More specifically, it attenuates some of the sound in the middle frequency range, and the pattern of attenuation is illustrated in FIG. 3.

To proceed now to a description of a very important feature of the present invention, the L−R component from the output terminal 46 is transmitted to a low pass filter 76 also to what is termed a "leading edge detector" 78, and also to a selectively operated noise control device 79. The filter 76, the detector 78, and the noise reducing device are connected in parallel with one another, and the outputs of these two components 76 and 78 are directed to a summing junction 80, which also receives the output from the low Q band pass filter 74.

The low pass filter 76 passes only the lower frequency portion of the L−R component (specifically in the present design those frequencies below 450 Hz), at a lower level (i.e. reduced by about 8 db). It has been found that this lower frequency portion of the L−R component, reduced in amplitude by about 8 db, contains little of the undesired noise and is much less susceptible to multipath distortion. Accordingly, it is transmitted undisturbed (except for the reduction in amplitude) to the summing junction 80.

The leading edge detector responds only to relatively abrupt changes in the amplitude of the L−R signal (i.e. either an abrupt increase or decrease in amplitude). When there is such an abrupt change, the detector 78 becomes conductive to transmit that portion of the L−R signal at a higher level to the summing junction 80. For steady state sound signals, the detector 78 transmits the signal at a substantially reduced level.

The output from the summing junction 80 is transmitted to the input terminal 82 of the output matrix 52. The input at 82 is combined with the L+R component input at 50 to produce the signals at the L and R terminals 40 and 42.

Figure 4:
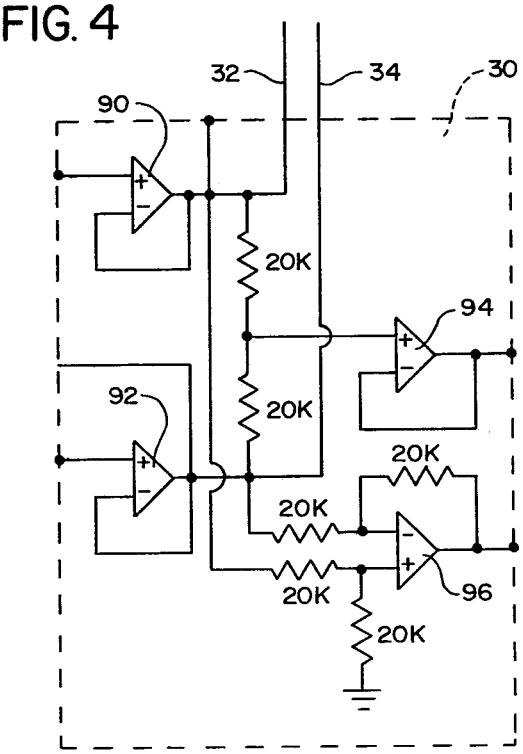
FIG. 4 is a circuit diagram of the input matrix.

To proceed now to a more detailed description of some of the components illustrated in FIG. 2, reference is now made to FIG. 4, which shows the input matrix 30. Since this input matrix 30 is of conventional design, it will be described only briefly herein. The left and right stereo signals are directed respectively to unity gain buffers 90 and 92. The outputs from the buffers 90 and 92 are directed through respective resistors to an operational amplifier 94, the output of which is the L+R signal component. Also, the output from the unity gain buffers 90 and 92 are directed to an operational amplifier 96 in a manner to be subtracted from one another to provide the L−R signal component.

Figure 5:
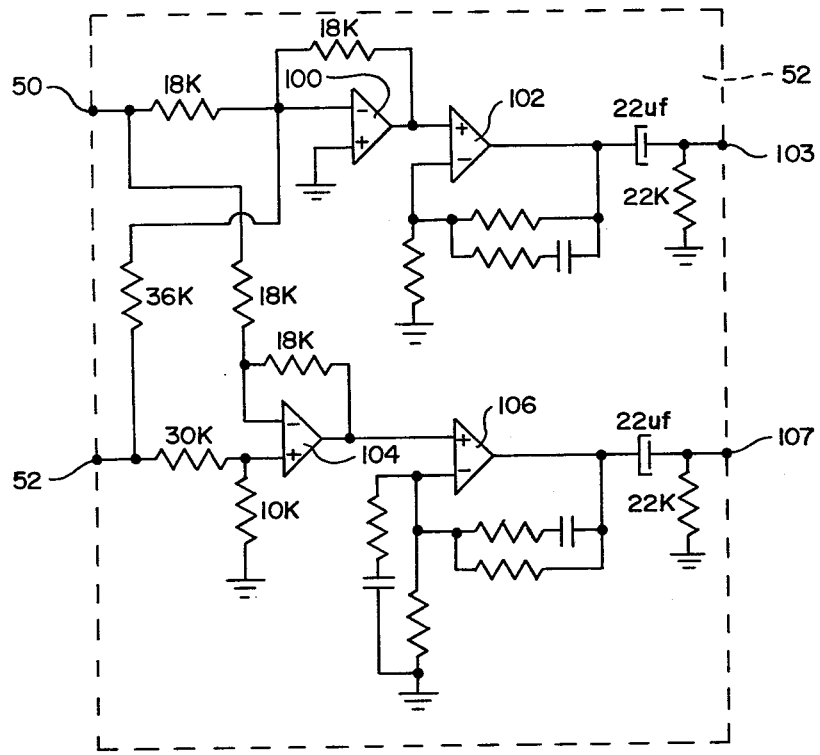
FIG. 5 is a circuit diagram of the output matrix.

In FIG. 5, there is shown the details of the output matrix 52. Since this is also of conventional design, it will be described only briefly. The two inputs at 50 and 82 are added to one another at the amplifier 100, and the output from the amplifier 100 is amplified by the amplifier 102 and transmitted to the L output 103. Also, the inputs at terminals 50 and 82 are directed to the amplifier 104, where the input at 82 is subtracted from the input at 50. The output from the amplifier 104 is directed to the amplifier 106 and thence to the R output terminal 107.

It will be recalled from the earlier description that the input at 50 is a pure L+R signal component. The input signal at the input terminal 82 is from the summing junction 80, which is a combination of the two time delay signals from the junction 59, the L−R low frequency signal from the filter 76, the L−R output from the leading edge detector 78, and the output from the noise control device 79. The manner in which the output from the junction 80 is combined in the matrix 52 is quite significant with respect to the operation of the present invention, and this will be discussed more fully later herein in connection with the overall operation of the present invention.

The two DC convertors 70 and 72 are of conventional design, so these will not be described in detail herein. As indicated previously, these convertors 70 and 72 take the L+R and L−R signal components, respectively, and convert these to DC signals which are in turn directed to the comparator 68.

Figure 6:
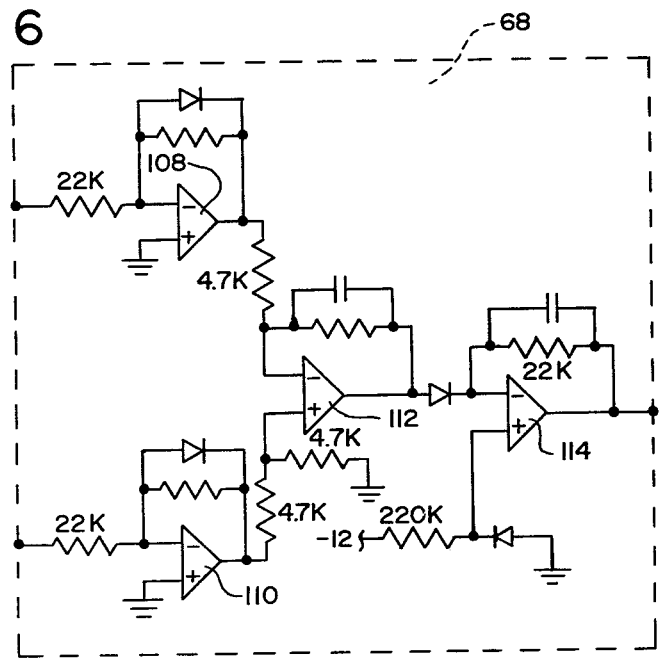
FIG. 6 is a circuit diagram of the comparator.

The logarithm/antilogarithm comparator 68 is shown in FIG. 6. The output from the L+R DC convertor 70 is directed to the amplifier 108, the output of which is a value equal to the log of the input voltage. In like manner, the DC output from the L−R DC convertor is directed to the amplifier 110, the output of which is the log of the input voltage. These two log values are subtracted from one another at the amplifier 112, and the output from the amplifier 112 is in turn directed to the anti-log amplifier 114. The amplifier 114 translates the log input into the actual numerical value of the log which is the ratio of the two inputs to the amplifiers 108 and 110. Thus, the output from the comparator 68 is a negative value, the absolute value of which is the ratio of the L+R signal component to the L−R signal component.

Figure 7:
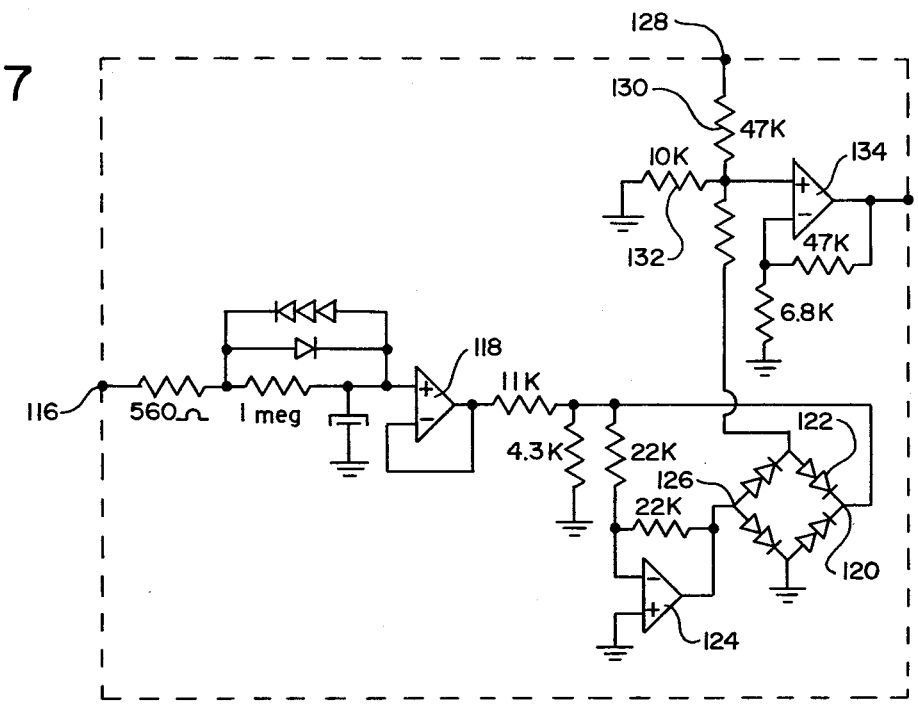
FIG. 7 is a circuit diagram of the automatic gain control amplifier.

The AGC amplifier 60 is illustrated in FIG. 7. The output from the comparator 68 is received at input terminal 116 and directed to an amplifier 118, the output of which is always a negative value. The output from the amplifier 118 is directed to one terminal 120 of the bridge 122, and is directed also through an inverting amplifier 124, the output of which is directed into an opposite side of the bridge 122 at 126. The output from the summing junction 59 is received at input terminal 128 and directed through two voltage dividing resistors 130 and 132. The voltage at the location between the resistors 130 and 132 is directed to the amplifier 134. When output from the amplifier 118 is more negative, it makes the bridge 122 more conductive to reduce the voltage level between the two resistors 130 and 132 and thus reduce the value of the signal transmitted to the amplifier 134. Thus, when the L−R signal is weaker the signal transmitted to the operational amplifier 134 is weaker.

Figure 8:
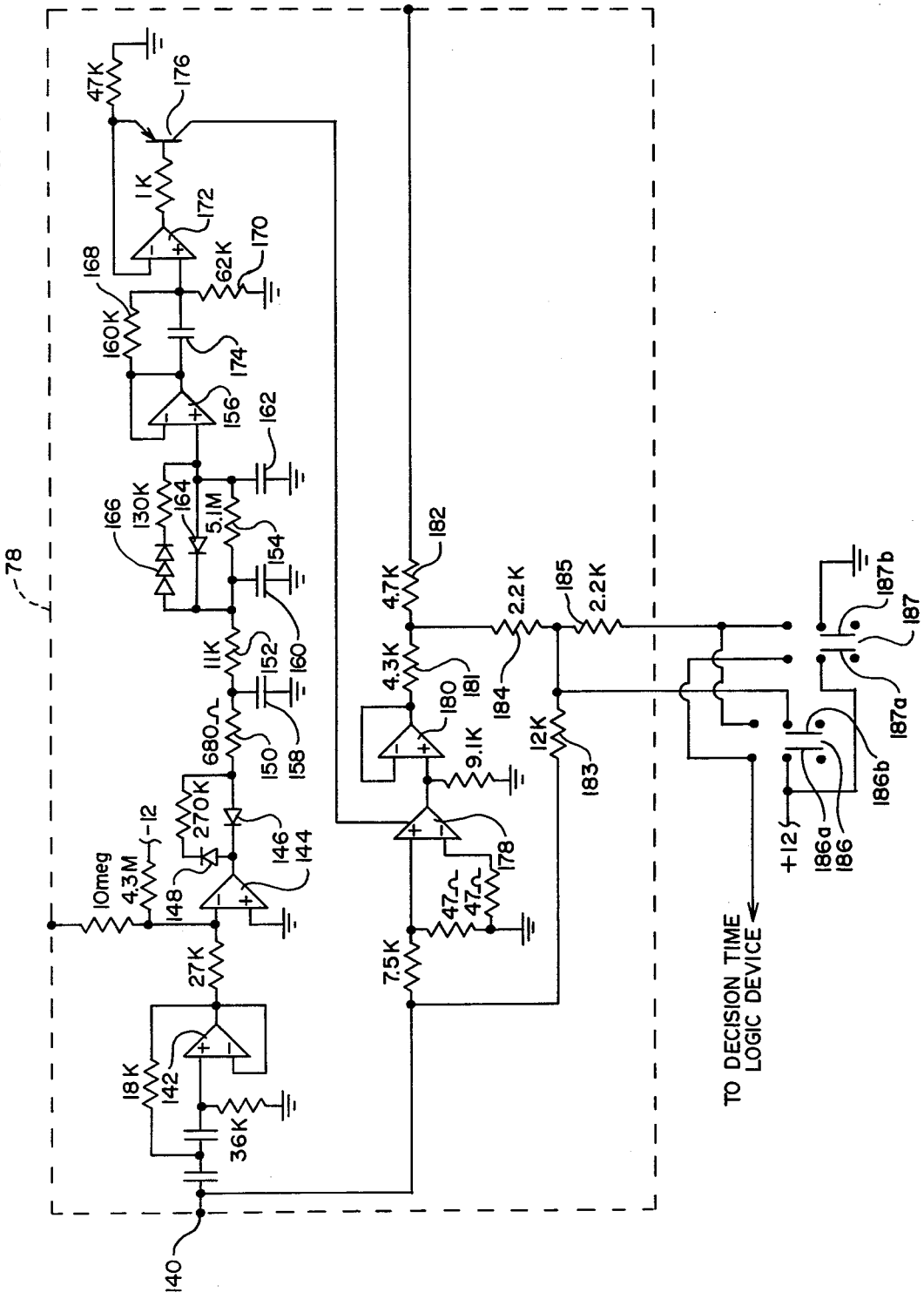
FIG. 8 is a circuit diagram of the leading edge detector along with the noise control device.

Attention is now directed to FIG. 8, which illustrates the leading edge detector 78. The L−R signal component is received at the input terminal 140 and directed to the amplifier 142, the output of which is further amplified by the amplifier 144. The output from the amplifier 144 is directed to the diodes 146 and 148. The result is that there is a DC output from the diode 146, which is transmitted through three resistors 150, 152, and 154, which are in series with one another and connected to the amplifier 156. Also, a first capacitor 158 is connected from the juncture between the resistors 150 and 152 to ground. A second capacitor 160 is connected from the location between the resistors 152 and 154 to ground. There is a third capacitor 162 which is connected between the input to the amplifier 156 to ground. The effect of these three capacitors 158, 160 and 162 is to successively dampen minor variations in the signal. These components are so arranged that the signal passing from the resistor 150 is moderately "smoothed", and the signal transmitted from the resistor 152 is "smoothed" to get a greater degree. The time constant of the capacitor 162 is such that the signal transmitted from the resistor 154 is a substantially constant voltage.

There are two sets of diodes, connected in parallel, from the location between the resistors 152 and 154 to the input terminal of the amplifier 156. More specifically, there is a first diode 164 arranged to pass a negative signal to the amplifier 156 and to block a positive going signal. There is a second set of three diodes 166 which are arranged to pass a positive going signal, but to block any negative going signal. When the negative signal from the operational amplifier 144 is going more negative (i.e. becoming stronger), and when the magnitude and duration rate of change of the signal is sufficiently great, it is able to overcome the bias of the diode 164 and transmit a signal to the amplifier 156. When the negative signal from the amplifier 144 is going less negative (i.e. decreasing in absolute magnitude), there must be a change of relatively greater magnitude and duration to overcome the bias of the three diodes 166 to cause a voltage change at the input of the amplifier 156. Thus, the circuit is arranged to be more responsive to an increase in amplitude in the L−R signal component, and to be somewhat less responsive to an abrupt decrease in magnitude of the L−R signal component. As will be discussed more fully later herein, the reason for this is that even though the abrupt increase as well as the abrupt decrease in amplitude contains directional information, the person's hearing is more receptive to the abrupt increase in amplitude as directional information.

The output from the amplifier 156 is directed through a pair of voltage dividing resistors 168 and 170, with the midpoint of these two resistors 168 and 170 being directed to the operational amplifier 172, so that there is an output to the amplifier 172 related to signal strength. Also, the output of the amplifier 156 is directed through a capacitor 174 to the input of the operational amplifier 172. The function of the capacitor 174 is to cause some differentiation of the signal output from the amplifier 156, in a manner that it will pass on the voltage where the rate of change in voltage, either up or down, is sufficiently steep. The output of the amplifier 172 is directed to the base of a transistor 176 to cause it to be conductive. This transistor 176 operates a current controlled amplifier 178, the input of which receives the L−R signal component directly from the operational amplifier 50. Thus, when there is a steady state signal of sufficient amplitude, the transistor 176 will become slightly conductive to cause the amplifier to pass the L−R signal at a low level. However, when the rate of change and magnitude of change of the L−R signal are sufficiently great to cause the transistor 176 to transmit through the capacitor 174, the amplifier 178 will pass the L−R signal component at a much higher level. The output of the amplifier 178 is directed to the amplifier 180, which is in turn directed to the aforementioned summing junction 80.

In the circuit described immediately above, only an abrupt increase in magnitude of the signal causes the transistor 176 to be more conductive to cause the amplifier to pass the L−R signal at a higher level. While the person's ear is more receptive to abrupt increases in amplitude to discern directional information, the person's hearing is also somewhat receptive to abrupt decreases in amplitude to ascertain direction. Accordingly, the leading edge detector of FIG. 8 can be modified slightly so as to be responsive also to abrupt decreases in amplitude, and this modification is shown in FIG. 8-A. For ease of description, the components in FIG. 8-A which correspond to certain components in FIG. 8 will be given like numerical designations with an "a" suffix distinguishing those in the modified form of FIG. 8-A.

Thus, there is an amplifier 156a which receives the same output as the amplifier 156 of FIG. 8. This output is directed through the two voltage dividing resistors 168a and 170a, and also through the capacitor 174a. There is added a pair of steering diodes D-10 and D-11 connected to, respectively, the plus and minus terminals of the amplifier 172a. In addition, a pair of voltage dividing resistors R-10 and R-11 have the midpoint thereof connected to the plus terminal of the amplifier 172a. The diode D-11 is connected through a resistor R-12 to the minus terminal of the amplifier 172a, and the emitter of the transistor 176a is connected through resistor R-13 to the minus terminal of the amplifier 172a.

With the arrangement described above, if there is an abrupt increase or an abrupt decrease in the amplitude of the signal emitted from the amplifier 156a, this will cause the amplifier 172a to have its output go to a higher level to make the transistor 176a more conductive. Thus, with this arrangement, the leading edge detector becomes responsive not only to the abrupt increase in signal strength of the L−R component, but also to an abrupt decrease in L−R signal strength.

The output from the amplifier 180 is directed through a pair of resistors 181 and 182 to the summing junction 80. A second pair of resistors 183 and 184 are connected in series between the input side of the amplifier 178 and a location between the resistors 181 and 182. Additionally, a fifth resistor 185 is connected to a location between the two resistors 183 and 184.

There is a first switch 186, having two switching elements 186a and 186b. In the position shown in FIG. 8, the switch 186 is open. When the switch W86 is moved to its closed position, the switching element 186a connects the decision time logic device 36 to the 12 volt source.

There is a second switch 187 which has two switching elements 187a and 187b. When this switch 187 is closed, the switching element 187a also connects the decision time logic device 36 to the 12 volt source. In addition, the switching element 187b connects the resistor 185 to ground in a manner to bleed off part of the L−R signal passing from the resistor 183 to the resistor 184.

When both of the switches 186 and 187 are closed, obviously the decision time logic device 36 is connected to the 12 volt source. In addition, with both switching elements 186b and 187b in the closed position, there is a straight path from the location between the resistors 183 and 184 through the element 186b and then through the element 187b to ground. These resistors 181–185 and the switches 186 and 187 comprise the noise control device 79.

Therefore, with only switch 186 closed, the time logic device 36 operates, with none of the signal passing through resistors 183 and 184 being bled off. When the switch 187 is closed, and the switch 186 open, also the decision time logic device 36 is connected to the 12 volt source, but a part of the signal passing through the resistors 183 and 184 is bled off. Finally, when both switches 186 and 187 are closed, in addition to supplying the voltage to the decision time logic device 36, the signal passing from the resistor 183 is connected directly to ground. Since this signal is the L−R signal component received directly from the input matrix 46, if the signal is very noisy, by pushing both switches 186 and 187 to the closed position, this noise can be largely eliminated. On the other hand, if the noise is somewhat less bothersome, it can be reduced to some extent by the closing of switch 187 and leaving the switch 186 open. On the other hand, if the noise is only moderate, the switch 186 can be closed, with the switch 187 open, so that none of the signal which passes in parallel with the leading edge detector 78 is bled off. It is to be understood, however, that even when none of this signal is bled off this L−R signal which bypasses the amplifiers 178 and 180 is relatively weak and of itself produces very little noise.

Figure 9:
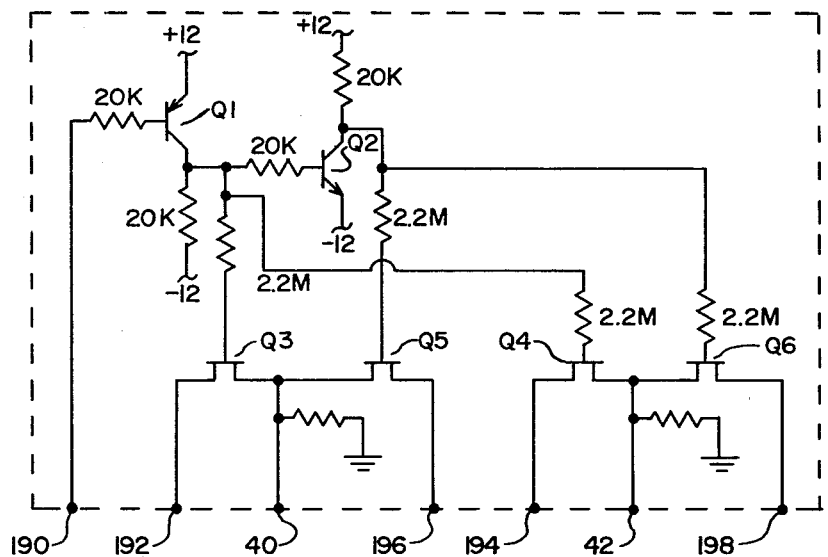
FIG. 9 is a circuit diagram of the logic driven output switching device.
Figure 8A:
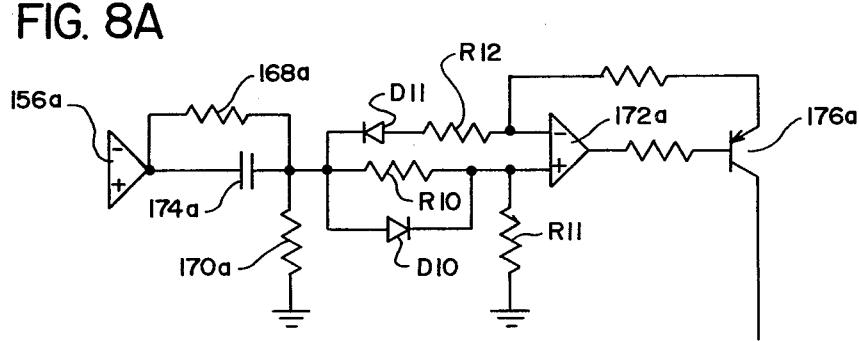

Reference is now made to FIG. 9 which illustrates the logic driven output switching device 38. The switching input terminal is 190, and it receives a signal from the decision time logic device 36. Also, there is an L input terminal at 192 and an R input terminal at 194. These are connected to the output terminals 103 and 107 of the output matrix 12. There is a second L input terminal 196, and a second R input terminal at 198. These terminals 196 and 198 are connected directly to the output lines 32 and 34, respectively, of the input matrix 30. The aforementioned L and R output terminals are indicated at 40 and 42, respectively.

To describe the operation of the switching device 38, the logic input at 190 is directed to the base of a transistor Q-1, the emitter of which is connected to a +12 voltage source and the collector of which is connected through a resistor to a −12 voltage source. The collector of the transistor Q-1 is also connected to the base of a second transistor Q-2, the emitter of which is connected to a −12 voltage source and the collector of which is connected to a +12 voltage source.

The collector of the transistor Q-1 is connected to the gates of the two field effect transistors Q-3 and Q-4, and the collector of the transistor Q-2 is connected to the gates of third and fourth field effect transistors Q-5 and Q-6.

When a +12 volt signal is imposed on the switching input terminal 190, the two transistors Q-1 and Q-2 are nonconductive, so that −12 volts is imposed at the gates of field effect transistors Q-3 and Q-4 to make them nonconductive. On the other hand, a +12 volt input is imposed on the gates of the field effect transistors Q-5 and Q-6 to cause them to be conductive. Thus, in this condition, the signal is taken directly from the input matrix 30 through the lines 32 and 34 and directed through the outputs 40 and 42.

However, when there is zero volts directed to the base of the transistor Q-1, transistor Q-1 and Q-2 both become conductive, with the result that a −12 volts is imposed upon the gates of the field effect transistors Q-5 and Q-6, while a voltage quite close to 12 volts is imposed upon the gates of the field effect transistors Q-3 and Q-4. The transistors Q-3 and Q-4 become conductive, so that the signal delivered to the outputs 40 and 42 is derived from the input terminals 192 and 194 which are in turn connected to the output matrix 50.

Figure 10:
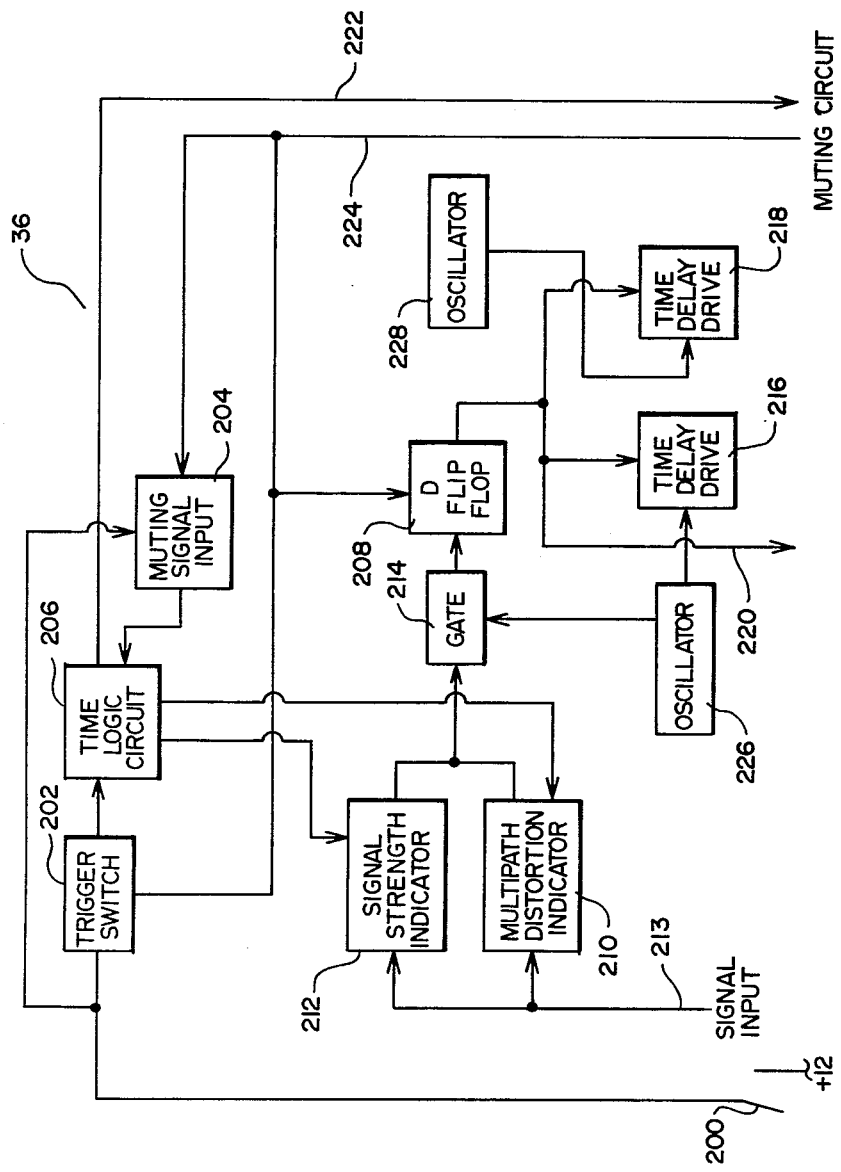
FIG. 10 is a block diagram of the decision time logic apparatus.

Reference is now made to FIG. 10, which is a schematic block diagram indicating the main functions of the decision time logic device 36. The operation of this device will first be discussed generally with reference to FIG. 10 and later, in more detail, with reference to FIG. 11.

As indicated previously herein, the function of the logic device 36 is to examine the composite FM stereo signal to determine if it is of sufficiently high quality to be transmitted to the output terminals 40 and 42. If it turns out that the signal is sufficiently strong and relatively free of distortion, the L and R signals are transmitted directly from the input matrix 30 to the outputs 40 and 42 to the logic driven output switching device 38. On the other hand, when the logic circuit 36 examines the FM stereo signal and determines that the signal is not adequate to be transmitted directly, then it diverts the signal through the various components of the present invention and finally to the output matrix 52. The output of the matrix 52 is then transmitted through the switching device 38 to the output terminals 40 and 42.

As indicated in FIG. 10, there is a switch identified by numeral 200 which is connected to a 12 volt source. This switch 200 actually comprises either of the switches 186 or 187, and for convenience of description, it is identified as a separate switch 200. Alternatively, the switch 200 could be made as a separate switch that is closed by closing either of the switches 186 or 187. By closing this switch 200, the logic device 36 is brought into operation. This switch 200 serves certain conventional functions of causing power to be transmitted to the various components of the device 36, as needed. Also, it delivers a 12 volt pulse to a triggering device 202 and a 12 volt input enable to a muting signal input 204.

When the triggering device 202 receives the 12 volt input, it immediately activates the time logic circuit 206 for a period of approximately 1 and ½ seconds. At the same time, the triggering device 202 causes a signal to be directed to the D flip flop 208 to enable it to become operative.

The time logic circuit 206 provides a "window" of approximately 1 and ½ second duration, during which a multipath distortion level indicator 210 and a signal strength indicator 212 become activated. The composite signal is directed through line 213 to the two indicators 210 and 212. If either of the indicators 210 and 212 determine that the composite signal is of sufficiently low quality, the indicator 210 or 212 sends a signal to the input of the gate 214. The clock input to gate 214 is then transmitted to the clock terminal of the D flip flop 208 to cause it to transmit an activating signal to two binary dividers which function as time delay drives 216 and 218. The two time delay drives 216 and 218 in turn power the two time delay devices 56 and 62.

Also, the output from the D flip flop 208 is directed through line 220 to the switching input terminal 190 of the logic driven output switching device 38.

In addition to activating the two indicators 210 and 212, the time logic circuit 206 transmits a muting signal through a line 222 to the main tuner to activate the muting circuit of that tuner to mute the sound during the 1 and ½ second examination period. The muting circuit of a conventional tuner is well known in the prior art, so it will not be described herein. Briefly, the muting circuit is activated during the change from one station to another so that there is not random noise being produced during the station change.

Further, there is a line 224 which is connected to the existing muting circuit of the tuner, and this supplies an input to the muting signal input 204. When this muting signal input 204 is activated, it in turn activates the time logic circuit 206 to cause it to operate for the 1 and ½ second examination period to determine whether the L and R signals should be processed and delivered to the output matrix 52. Thus, with the decision time logic device 36 operative, each time there is a station change, the time logic circuit 206 is activated for the 1 and ½ second period to examine the quality of the signal from the new station to see if the processing components of the present invention should be brought into operation.

Also, there are two oscillators 226 and 228. The oscillator 226 supplies pulses to the time delay drive 216 and to an input on gate 214 to enable those components to become operative. The oscillator 228 provides a pulsating input to the time delay drive 218 to enable it to become operative.

Figure 11A:
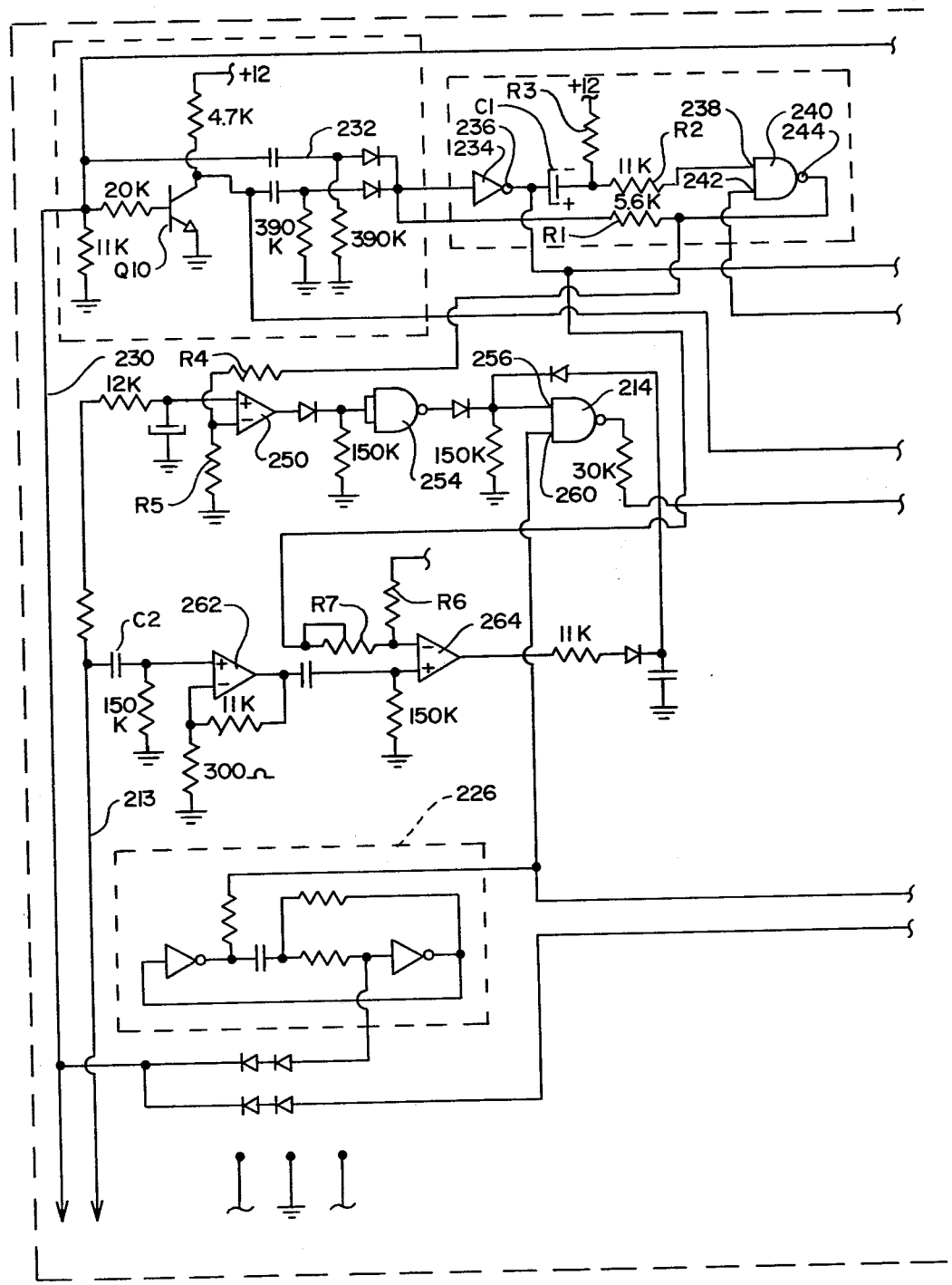
FIG. 11 is a circuit diagram, drawn on two separate sheets, of the decision time logic device of FIG. 10.
Figure 11B:
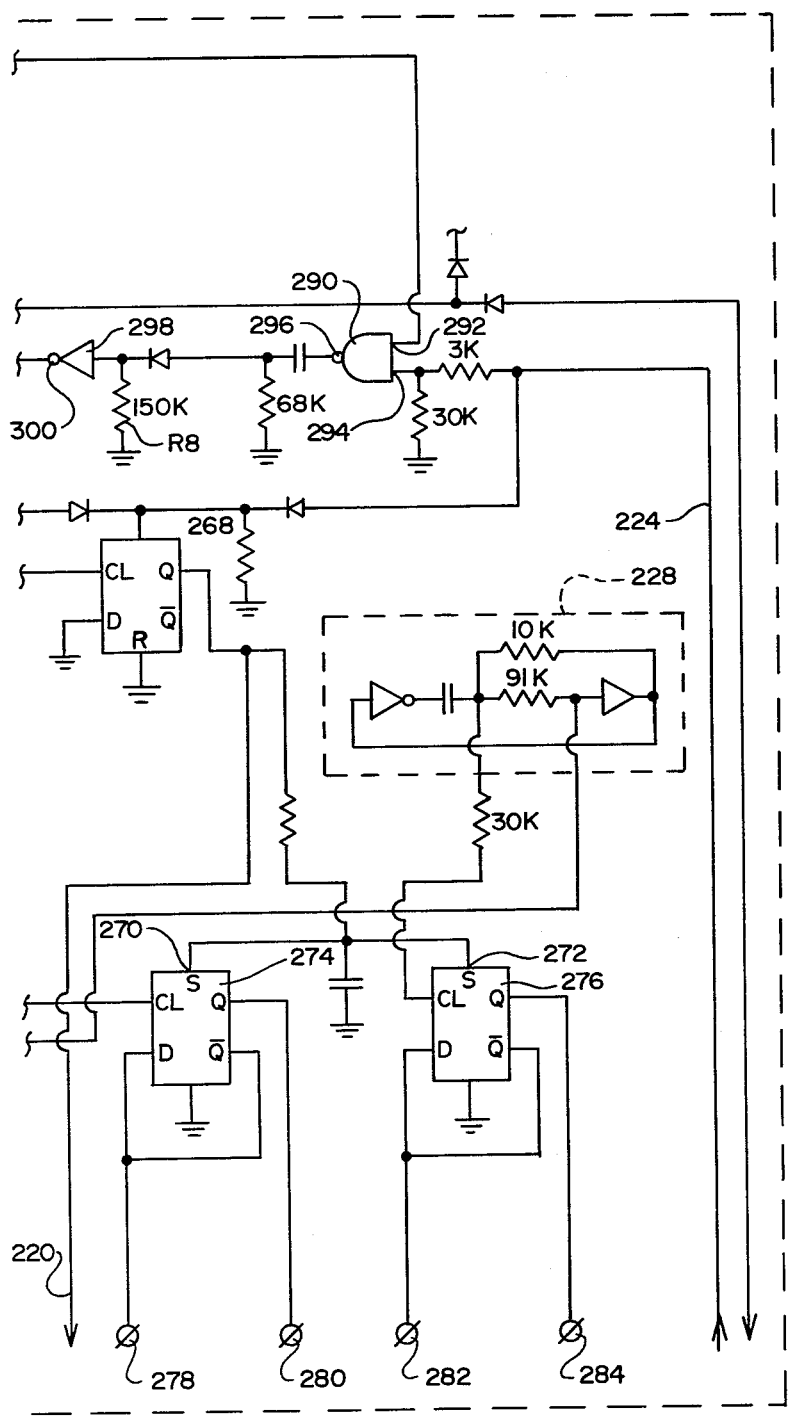

Before proceeding to a detailed description of the logic circuit 36 with reference to FIG. 11, it may be helpful to review the operation of the components as disclosed in FIG. 10. Let it be assumed that the main FM tuner with which the present invention is associated has been turned on and is producing stereo signals, and let it be assumed that the switch 200 is open. In this situation, the left and right stereo signals from the existing tuner pass into the matrix 30, to be transmitted through the lines 32 and 34 and then transmitted directly through the outputs 40 and 42. Let it now be assumed that the listener wishes to determine if the signal should be improved, and the listener closes the switch 200. The immediate effect is to cause the triggering device 202 to activate the time logic circuit 206 for the 1 and ½ second examination time. During this 1 and ½ second examination time, the multipath distortion level indicator 210 looks at amplitude variations in the composite signal to determine if there is sufficient distortion to warrant processing the L and R signals through the various components of the present invention. At the same time, the signal strength indicator 212 examines the signal strength to determine if it is sufficiently weak to warrant processing of the L and R signals. (If the signal is rather weak, it can be assumed that there will be enough random noise in the amplified signal so that the output would be of sufficiently low quality to warrant the processing of the signals through the various components of the present invention.) Let it be assumed that at least one of the indicators 210 or 212 determines that the signal is sufficiently defective to warrant processing. Then one or the other of the indicators 210 or 212 sends an activating signal to the input of the gate 214 (which is already receiving pulses from the oscillator 226), and this gate 214 supplies the pulses to the D flip flop 208 (which has already been activated from the triggering device 202). The D flip flop 208 transmits an activating signal to the two time delay drives 216 and 218 to activate the two time delay circuits 56 and 62. In addition, the output from the D flip flop 208 acts through the input 190 of the logic driven output switching device 38 to cause the outputs from the output matrix 52 to be transmitted through the device 38 to the output terminals 40 and 42, with the output of lines 32 and 34 being shut off.

During the 1 and ½ second decision period, the time logic circuit 206 also sends a signal through line 222 to activate the muting circuit of the existing tuner. It should be noted that this 1 and ½ second delay in the production of sound will occur whether or not the indicators 210 and 212 react immediately during the first part of the 1 and ½ second decision period or later in that period, or do not react at all.

On the other hand, let it be assumed that the switch 200 is closed to activate the time logic circuit 206, but that the existing stereo signal from the existing tuner is of sufficiently high quality. Under these circumstances, the time logic circuit 206 would still send the muting circuit to the tuner to shut off the sound for the 1 and ½ second decision period. However, since neither of the indicators 210 or 212 would send an activating signal, at the end of the 1 and ½ second decision period, the L and R signals would be transmitted from the input matrix 30 through the two lines 32 and 34 and out of the output terminals 40 and 42.

Let it now be assumed that the person decides to change stations in the existing FM tuner, with the switch 200 having been previously closed. This would cause the muting circuit to generate a muting signal in the tuner, and this would be transmitted through the line 224 to the muting signal input 204, which would in turn transmit a signal to the time logic circuit 206 and initiate another 1 and ½ second examination period for the new station. It should be indicated that the output from the muting signal input 204 begins at the termination of the muting signal through the line 224. Thus, the tuner would first find the new station, at which time the muting circuit in the existing tuner would turn off. Then the indicators 210 and 212 would have a full 1 and ½ second period to examine the signal from a new station to determine whether or not the signal should be processed.

Let it now be assumed that the person decides to open the switch 200 and listen to the music produced by the unprocessed L and R stereo signals. In this instance, the triggering device 202 is arranged so that upon opening of the switch 200, the time logic circuit 206 is activated for the 1 and ½ second period to cause the muting circuit of the tuner to be activated for this 1 and ½ second period. This 1 and ½ second delay provides a time separation from the production of sound from the processed signals and the unprocessed signals.

Reference is now made to FIG. 11 which shows the decision time logic device 36 in more detail. The switch 200 connects through a line 230 to the base of a transistor Q-10, the collector of which is connected to +12 volt source. The line 230 also bypasses the transistor Q-10 to supply a 12 volt pulse through a line 232 to an inverter 234. This causes the output at 236 of the inverter 234 to go to zero. This zero voltage is transmitted through a resistor and a capacitor C-1 to an input terminal 238 of a nand gate 240. The other input terminal to the nand gate 240 is indicated at 242. The nand gate 240 is such that if both of the input terminals 238 and 242 have 12 volts imposed thereon, the output at 244 of the nand gate 240 will drop to zero. On the other hand, if the voltage of either of the two end terminals 238 and 240 drops to zero, the output at 244 jumps to 12 volts. In this instance, since the point 236 has abruptly dropped to zero, the input at 238 drops to zero to cause the nand gate output 244 to abruptly rise to the 12 volt level. This 12 volts is transmitted through resistor R-1 back to the input of the inverter 234 to hold the output at 236 at zero voltage. However, it will be noted that the input terminal 238 is connected through two voltage dividing resistors R-2 and R-3 to a +12 voltage source, with the capacitor C-1 being connected to a point intermediate to resistors R-2 and R-3. The time constant of the capacitor is such that after 1 and ½ seconds, it becomes charged back toward the 12 volt level to a sufficient extent to cause the output 244 of the nand gate 240 to go low, and thus act through the inverter 234 to cause the output at 236 to go up to the 12 volt level.

To relate the discussion immediately above back to the block diagram of FIG. 10, the components 234 through 244, the resistors R-1 through R-3 and the capacitor C-1 make up the time logic circuit 206 that provides the 1 and ½ second window for examination of the circuit. The transistor Q-10 and the line 232 are part of the triggering device 202.

The output point 236 of the inverter 234 supplies the signal for the multipath distortion level indicator 210 and also the signal through line 222 to activate the muting circuit in the existing FM tuner. The output at 244 from the nand gate 240 provides the activating signal for the signal strength indicator 212.

To proceed now to a description of the signal strength indicator 212, there is an operational amplifier 250 which functions as a comparator and has one input terminal connected through the line 213 to the composite signal source from the existing tuner. The other terminal of the amplifier 250 is connected through one resistor R-4 to the output 244 of the nand gate 240, and also through another resistor R-5 to ground. When the output at 244 goes positive, it acts through the two voltage dividing resistors R-4 and R-5 to provide a reference voltage for the amplifier 250. If the signal strength is relatively high, then the output of the nand gate 254 will be at zero. However, if the operational amplifier 250, which acts as a comparator, detects a weak signal, it will put out a very low signal which will cause the nand gate 254 to go high and transmit a 12 volt signal to one terminal 256 of a nand gate 214. The other terminal 260 of the nand gate 214 is connected to the output of the oscillator 226 which thus transmits 12 volt positive pulses to the terminal 260.

Thus, the operational amplifier 250, with the resistors R-4 and R-5, and the nand gate 254 are part of the signal strength indicator 212. The oscillator 226 is of conventional design, so its components will not be described in detail herein.

To proceed now to a description of the multipath distortion level indicator 210, there is an operational amplifier 262, one terminal of which is attached through a capacitor C-2 and line 213 to the composite signal source. This operational amplifier 262 responds to small ripples in the composite signal that would be caused by multipath distortion. The output of the amplifier 262 is directed to one terminal of the operational amplifier 264 which functions as a comparator. The other terminal of the comparator 264 is connected through one resistor R-6 to ground, and through a variable resistor R-7 to the output 236 of the inverter 234. Thus, when the output 236 goes to zero, the two resistors R-6 and R-7 act as voltage dividing resistors to provide a reference voltage level to the comparator 264. If the output from the amplifier 262 reaches a sufficiently high level, it will cause the comparator 264 to send a signal to the input terminal 256 of the nand gate 214.

Thus, it becomes apparent that the nand gate 214 responds to either of two inputs to provide a pulsing output. One such input is due to low signal strength, and this is provided by the indicator 212 (made up of comparator 250 and nand gate 254). The other input is from the multipath distortion level indicator (comprising the amplifier 262 and comparator 264). As indicated previously, as soon as the switch 200 is closed, the oscillator 226 provides a constant pulsing voltage at the terminal 260 of the nand gate 214. When the nand gate 214 becomes activated by either of the indicators 210 or 212, it transmits positive pulses to the clocking input 266 of the D flip flop 208.

The set input terminal 268 of the D flip flop 208 is connected to the collector of the transistor Q-10. When the switch 200 is open, the voltage at the set input 268 will be at 12 volts, to cause the Q output terminal of the D flip flop 208 to remain at 12 volts. This 12 volt output is the equivalent of no signal at all, in that it will not activate either of the time delay drives 216 or 218 nor the switching input of the logic driven output switching device 38. However, when the switch 200 is closed to cause the transistor Q-10 to operate, the voltage at the collector drops nearly to zero, which produces a near zero voltage at the set input 268. As soon as the positive pulses are transmitted to the clock input 266, this causes the Q output terminal to drop to the same voltage as the D terminal, which is zero voltage. This in turn imposes zero voltage level at the two set inputs 270 and 272 of the D flip flops 274 and 276, respectively.

The D flip flops 274 and 276 comprise the time delay drive 216 and the time delay drive 218, respectively. The pulsing input for the D flip flop 274 is received from the oscillator 226. The two output lines 278 and 280 of the D flip flop 274 provide the drive for the first time delay circuit 56. The D flip flop 276 receives its pulsing input from the oscillator 228, which is of itself of conventional design. The two output lines 282 and 284 of the D flip flop 276 supply the drive to the second time delay device 62.

Also, the output from the Q terminal of the D flip flop 208 is directed through a line 220 to the input terminal 190 of the logic driven output switching device 38. As indicated previously in the description of that device 38, when the voltage on line 220 is 12 volts, the L and R outputs 40 and 42 are derived directly from the L and R inputs from the matrix 30. However, when the voltage at line 220 drops to zero, this acts on the switching device 38 to cause the outputs to come from the output matrix 52.

To proceed now to a description of the muting signal input device 204, there is a nand gate 290 having a first input terminal 292 and a second input terminal 294. The terminal 292 is connected directly to the switch 200 so as to have a constant 12 volts imposed thereon. The other input terminal 294 is connected through the line 224 to an output from the existing muting circuit in the existing FM stereo tuner. The output terminal 296 of the nand gate 290 is connected to the input of an inverter 298. The output 300 of the inverter 298 is connected to the terminal 242 of the nand gate 240 of the time logic circuit 206.

When the two terminals 292 and 294 of the nand gate 292 are at +12 volts, the output at 296 is zero. At this time, the output at the terminal 300 of the inverter 298 is at +12 volts, due to resistor R-8 being connected to ground. This permits the nand gate 240 to operate in the manner discussed above. Let it now be assumed that the switch 200 is closed and the capacitor C-1 is charged up to the full 12 volts so that the input terminal 238 is also at 12 volts. Let it now be assumed that the operator of the FM tuner changes the channel so that the muting circuit sends out a 12 volt signal to the terminal 294. At this instant, both terminals 292 and 294 are at +12 volts, and there is no effect on the inverter 300. However, as soon as the tuner has moved to a new channel so that the muting circuit goes off, the voltage at 294 drops to zero, which in turn causes the output 296 of the nand gate 290 to go up to 12 volts, which in turn causes the output of the 300 of the inverter 298 to go to zero and thus cause the output 244 of the nand gate 240 to go to 12 volts positive. This activates the time logic circuit 206, in that it causes the output 236 of the inverter 234 to go to zero. Thus, the aforedescribed process of the signal strength indicator 212 and the multipath distortion level indicator 210 become active to determine the strength and distortion of the new signal.

To further describe the operation of the muting signal input device 204, let it be assumed that the entire FM tuner is turned off, and that the switch 200 is closed. When the FM tuner is turned on, the muting circuit is automatically activated for about ½ of a second. At the end of that ½ second, the voltage at 294 would drop to zero, to cause the nand gate 290 to have its output 296 go to 12 volts, thus acting through the inverter 300 and through the nand gate 240 to cause the time logic circuit 206 to initiate the 1 and ½ second examination period of the FM stereo signal.

Finally, let it be assumed that the main FM tuner is operating, and the switch 200 is closed. Now let it be assumed that the listener desires to bypass the processing components of the present invention and listen to the L and R stereo signals as they are. As soon as the switch 200 is opened, this makes the abovementioned transistor Q 10 nonconductive, so that the voltage at the collector of the transistor Q-10 immediately goes to 12 volts. This in turn causes the 12 volt pulse to be transmitted to the inverter 234 to activate the time logic circuit 206 in the manner described above. The effect of this is simply to cause the muting signal to be transmitted to the line 246 for about 1 and ½ seconds. Thus, there is the 1 and ½ second delay before the FM stereo tuner produces any sound. This time separation from going from the processed signal to the unprocessed signal is desireable in that it avoids any abrupt transients.

With the detailed description of the apparatus of the present invention completed, reference is again made to FIG. 2 to review the overall operation of the present invention. As indicated previously, the apparatus of the present invention in this present embodiment is used in connection with a conventional FM tuner which is adapted to receive stereo signals and to convert these to left and right audio-output signals that could be used directly to produce FM stereo music. However, as indicated previously, since these left and right stereo signals were reconstructed from a previously transmitted L+R and L−R signal components, the reconstructed left and right output signals (i.e. the L and R signals) carry the defects of any multipath distortion and undesirable noise attributable to the L−R component.

The left and right inputs are transmitted directly to lines 32 and 34 which in turn supply these signals to the input terminals 196 and 198 of the logic driven output switching device 38. At the same time, the input matrix 30 provides the L+R signal component through line 44 and the L−R signal component through the line 46. The circuit processing components of the present invention are brought into play by closing the switch 200 of the logic device 36. As indicated previously, this will cause the logic device 36 to examine the composite signal to determine if there is sufficiently high signal strength and sufficiently low multipath distortion. If both these conditions exist, the logic device 36 will not act further, and it will continue to transmit a +12 volt signal to the input 190 of the logic driven output switching device 38. This will cause the L and R input signals to be transmitted directly through the outputs 40 and 42.

However, if it is determined that the composite signal is inferior, the logic device 36 will cause a zero volt signal to be delivered to the terminal 190 of the switching device 38 and thus disconnect the output terminals 40 and 42 from the input terminals 196 and 198, and instead connect these terminals 40 and 42 to the terminals 192 and 194, these terminals being connected to the output terminals 103 and 107 of the output matrix 52. Also, the decision time logic device 36 activates the two time delay drives 216 and 218 (which are the D flip flops 274 and 276) to deliver power to the two time delays 56 and 62.

As described previously in the general description of the present invention with regard to the block diagram of FIG. 2, the L+R signal is directed through line 54 through the time delay device 56, then through the high pass filter 58. This produces an L+R signal which is delayed by about 11 milliseconds and in the frequency range above about 3 kHz. The output from the high pass filter 58 is directed to the summing junction 59. Also, the L+R signal is directed through the low pass filter 60, the time delay 62 and the high pass filter 64. The effect is to produce an L+R signal which is delayed by about 26 milliseconds, in the frequency range between about 480 Hz to 3 kHz, with some output below 480 Hz. This output is also delivered to the summing junction 59.

As described previously, the output from the junction 59 has its amplitude controlled by the automatic gain control amplifier 66 in a manner that when the ratio L−R/L+R is small, the gain of the amplifier 66 is low. On the other hand, when the ratio L−R/L+R is large, the gain of the amplifier 66 is correspondingly high. The output from the amplifier 66 is directed through the filter 74 and then to the summing junction 80.

With regard to the L−R signal component derived from the output terminal 46, as described above, this L−R signal component is passed through the filter 78 so that there is provided to the summing junction 80 an input containing the L−R information below 450 Hz. Also, the L−R signal is passed through the leading edge detector 78. As can be easily perceived from an examination of the detailed description of the leading edge detector 78, when there is no abrupt change of sufficient magnitude in the L−R signal component, the detector 78 transmits the L−R signal component at a reduced level. Thus, the L−R signal components are mainly in the range below 450 Hz at a reduced level. Since the lower frequencies of the L−R signal component are much less susceptible to random noise and multipath distortion, and is passed to summing junction 80 at a reduced level, the output from the filter 76 does not contribute to the degradation of the end signal to any great degree.

Also, the L−R signal is passed at a reduced level through the device 79 to the summing junction 80. However, the switches 186 and 187 can be closed selectively to bleed off this signal if the noise in the L−R component is excessive.

When there is a rather abrupt change in amplitude of L−R signal component, the leading edge detector 78 becomes more conductive during the period of the change. In the form shown in FIG. 8, the detector 78 is arranged so that it is sensitive only to abrupt increases in amplitude. In the modified form of FIG. 8-A, the detector 78 is responsive to both abrupt increases and decreases to cause the L−R signal to be transmitted to the summing junction 80 at a higher level during such abrupt increases or decreases.

With the foregoing in mind, let us now examine how the various inputs are combined in the matrix 52 to produce the output. Let it be assumed that FM stereo music is being transmitted and that we are looking at a short time increment of music where there is no abrupt beginning or ending of an identifiable sound. Let it further be assumed that the signal is sufficiently weak or there is sufficient multipath distortion so that the signal processing components of the present invention are brought into operation. At this instant, the two delayed L+R signals would appear at the summing junction 80, and there would be the L−R signal containing the frequencies below 450 Hz also at the junction 80 at a somewhat reduced level, and the higher frequency portions of the L−R component being transmitted only at a substantially reduced level. This combined signal is transmitted from the junction 80 to the input terminal 82 where it is added to the L+R signal to produce the output at 40, and is subtracted from the L+R output to produce the output at 42.

In this situation, with regard to the frequencies below 450 Hz, it is readily apparent that the L signal component is emitted from the output 40, while the R signal component is emitted from the output 42 with some crossover due to the reduced level of the low frequency L−R. With regard to the frequencies above 450 Hz, since there is very little or almost no L−R component to be added, the L and R signal portions above 450 Hz are emitted from both the L output 40 and the R output 42. However, since at this instant there is little directional information in the sound, there is really no loss of the stereo effect. Further, since the output from the junction 59 supplies the delayed ambient component of the sound that is redundant in L+R, the fullness of the musical stereo sound is not lost.

Let us now view another instant in the musical signal where a distinct musical sound is being initiated so that there is a "leading edge" detected at the leading edge detector 78. At this instant, the full L−R signal is transmitted to the junction 80. This in turn is transmitted into the matrix 52, with the result that the output at 40 is a more pure L signal, while the output at 42 is more of a pure R signal. Since at this instant the music contains directional information, the person mentally fixes on the newly introduced sound to identify it as emanating from one or the other of the speakers. Immediately after the person mentally fixes that location of sound, the leading edge detector 78, now sensing that the abrupt change in amplitude has passed, substantially diminishes the L−R signal above 450 Hz. However, the person's mind, having heard the initiation of the sound in stereo still has the directional impression and thus does not have the stereo effect reduced. On the other hand, the harmful effect of the undesired noise in the higher frequencies in the continuing L−R sound has been substantially diminished, since the very short periods when the leading edge detector 78 is transmitting full L−R signal strength are so short that the noise during those short periods is hardly noticeable.

It is to be understood that the above explanation is somewhat general, and while it is believed to be reasonably accurate in its explanation of the musical phenomena produced, there are likely other effects which are not included in this explanation. However, regardless of the completeness or correctness of the above explanation, it has been found that with the present invention, the fullness of the stereo sound and the directional information of the stereo sound can be effectively reproduced, while alleviating almost all of the undesired random noise and multipath distortion. Also, it is readily recognized that various modifications could be made to the apparatus of the present invention, without departing from the basic teachings thereof.

I claim:

1. An apparatus to provide an improved FM stereo output, where there is an L+R signal component corresponding to the sum of an L signal and an R signal, and an L−R signal component corresponding to the difference of the L signal and the R signal, said apparatus comprising:
   (a) input means to provide an input signal made up of said L+R signal component and said L−R signal component;
   (b) output means including matrix means to receive and combine said signal components at respective sufficiently high levels to produce a first output mode where there is a first output component corresponding more to said L signal and a second output component corresponding more to said R signal so as to be able to provide directional information, and to receive at least said L+R signal at a sufficiently greater level than said L−R signal to produce a second output mode where said first and second output components both correspond more closely to said L+R signal component;
   (c) control means including detector means to detect from said signal first signal portions where there is a more abrupt change of amplitude and to transmit the L−R signal components of said first signal portions at said sufficiently high level to produce said first output mode, and during second signal portions other than said first signal portions to diminish said L−R signal component relative to said L+R signal component to produce said second output mode.

2. The apparatus as recited in claim 1, wherein said control means is arranged to diminish primarily a higher frequency portion of said L−R signal component during said second signal portions.

3. The apparatus as recited in claim 2, wherein said control means comprises a low pass filter to transmit a low frequency portion of said L−R component to said matrix means, independently of said detector means.

4. The apparatus as recited in claim 3, said control means further comprising amplifier means to receive said L−R signal component and to transmit said L−R signal component to said matrix means, said detector means being responsive to said abrupt change of amplitude to cause said amplifier means to transmit the L−R signal component at a higher level in response to said detector means detecting said abrupt change of amplitude.

5. The apparatus as recited in claim 4, further comprising noise control means connected to said matrix means in parallel with said amplifier means to transmit said L−R signal component to said matrix means, said noise control means having selectively operable switch means to diminish the L−R signal component delivered by said noise control means so as to be able to diminish noise contributed by said L−R signal component.

6. The apparatus as recited in claim 4, wherein said detector means is responsive primarily to increases in amplitude of said signal to transmit the L−R signal component of said first signal portions at said sufficiently high level.

7. The apparatus as recited in claim 4, wherein said detector means is responsive to both abrupt increases and decreases in the amplitude of the signal to transmit the L−R signal component of the first signal portions at said sufficiently high level.

8. The apparatus as recited in claim 1, further comprising time delay means adapted to receive said L+R signal component and to provide a delayed L+R signal input to said output means, so as in turn to produce a delayed L+R output from said output means.

9. The apparatus as recited in claim 8, wherein said time delay means comprises a first time delay device to produce a first delayed L+R signal input of a shorter delay and a second time delay device to produce a second delayed L+R signal input of a greater delay.

10. The apparatus as recited in claim 9, said control means further comprising time delay control means to control amplitude of said delayed L+R signal input in accordance with relative signal strength of the L−R signal component in comparison to the L+R signal component.

11. The apparatus as recited in claim 10, wherein said time delay means is arranged so that one of said time delay devices produces its time delay input at a higher frequency range of the L+R signal component, and the other time delay device produces the delayed input at a lower frequency portion of the L+R input.

12. The apparatus as recited in claim 11, wherein the first time delay device produces the shorter time delay input at said higher frequency, and the second time delay device produces the longer delay input at the lower frequency.

13. The apparatus as recited in claim 8, further comprising time delay control means to control amplitude of said delayed L+R signal input in accordance with relative signal strength of the L−R signal component in comparison to the L+R signal component.

14. The apparatus as recited in claim 13, further comprising filter means to receive the delayed input from the time delay means and to diminish a middle frequency portion of said time delayed input relative to low and high frequency portions thereof, so as to provide a modified input which is transmitted to said output means.

15. The apparatus as recited in claim 13, further comprising comparator means to control amplitude of the delayed input in accordance with the amplitude of the L−R signal component relative to the L+R signal component, said comparator comprising:
(a) first means to receive a first input value related to the L+R signal component and to produce a first output value related to a log of the first input value,
(b) second means to receive a second input value related to the L−R signal component and to produce a second output value related a log of said second input value,
(c) third means to subtract the output values from one another and to produce a third output value related to actual value of the ratio of the first and second input values of the first and second means,
(d) fourth means to direct said third output to said time delay control means to increase or decrease amplitude of the delayed input relative to increase or decrease, respectively, of the ratio of the L−R signal component to the L+R signal component.

16. The apparatus as recited in claim 13, wherein there is control logic means to cause said output means to be selectively responsive to said control means, said control logic means comprising:
(a) signal strength indicator means responsive to a value related to said input signal in a manner to determine a low signal strength condition where signal strength is below a predetermined signal value,
(b) multipath distortion indicating means responsive to variations in a value relating to said input signal to indicate a multipath distortion condition where multipath distortion is above a predetermined multipath distortion level,
(c) logic output means responsive to said signal strength indicator means and said multipath distortion indicator means to cause said output means to be responsive to said control means when the signal strength is below said predetermined signal strength level or said multipath distortion is above said predetermined multipath distortion level.

17. The apparatus as recited in claim 16, wherein said control logic means further comprises a time logic circuit means to initiate a predetermined examination time period and to cause said signal strength indicating means and said multipath distortion indicating means to become operative during said examination time period so as to be able to make said logic output operative during said examination time period.

18. The apparatus as recited in claim 17, wherein said time logic circuit means includes muting means to cause sound output of said apparatus to become muted during said examination time period.

19. The apparatus as recited in claim 18, wherein said time logic circuit means is responsive to station change indicating means of said apparatus, in a manner to initiate said examination time period to cause said signal strength indicator means and said multipath distortion indicator means to become activated where there is a change of station input to said apparatus.

20. The apparatus as recited in claim 19, wherein there is muting signal input means responsive to a muting signal of said apparatus to cause said time logic circuit to initiate said examination period in response to the muting signal of said apparatus.

21. The apparatus as recited in claim 20, further comprising a trigger switch means responsive to initiation of operation of said control logic means, to cause said trigger switch means to act on said time logic circuit means to initiate said examiniation time period.

22. The apparatus as recited in claim 21, wherein said output means is characterized in that it can produce an L signal and an R signal directly from said output means, said trigger switch means being responsive to deactivation of said control means to cause said time logic circuit means to mute sound output for a time period after said control means is deactivated and before said L and R signals are transmitted directly from said output means.

23. The apparatus as recited in claim 17, further comprising a trigger switch means responsive to initiation of operation of said control logic means, to cause said trigger switch means to act on said time logic circuit means to initiate said examiniation time period.

24. The apparatus as recited in claim 23, wherein said output means is characterized in that it can produce an L signal and an R signal directly from said output means, said trigger switch means being responsive to deactivation of said control means to cause said time logic circuit means to mute sound output for a time period after said control means is deactivated and before said L and R signals are transmitted directly from said output means.

25. The apparatus as recited in claim 1, wherein said detector means comprises:
   (a) capacitor means to receive a value related to said L−R signal component and to transmit a differentiated signal related to rate of change of said L−R signal component,
   (b) signal control means responsive to said differentiated signal to produce a control signal related to said differentiated output,
   (c) L−R variable transmitting means adapted to transmit said L−R signal component to said output means at a variable output level, and responsive to said control signal to transmit said L−R signal component at a greater or lesser level depending upon magnitude of said differentiated output from said capacitor means.

26. The apparatus as recited in claim 25, wherein said detector means further comprises rectifying means to receive said L−R signal component and produce a rectified L−R signal value, amplifier means to receive said rectified L−R signal value to produce said value related to said L−R signal component, means providing a circuit path from said amplifier to said signal control means to transmit to said signal control means a value related to absolute magnitude of the value related to the L−R signal component.

27. The apparatus as recited in claim 1, wherein said detector means comprises:
   (a) rectifying means to receive said L−R signal component and provide a rectified L−R signal,
   (b) a first amplifier means to receive said rectified L−R signal and produce an L−R value output related to said rectified signal,
   (c) capacitor means to receive said L−R value output and to produce a differentiated signal related to rate of change of said L−R value output,
   (d) resistor means bypassing said capacitor to transmit said L−R value output in a path paralleling said capacitor means,
   (e) L−R signal control means to receive said differentiated signal from the capacitor means and said L−R value output from the resistor means and to produce an L−R control signal responsive to said differentiated output and said L−R value output,
   (f) second amplifier means to transmit said L−R signal component to said output means at a variable output level, and responsive to said L−R control signal to transmit said L−R signal component at greater or lesser level depending upon magnitude of said differentiated output of said capacitor means.

28. The apparatus as recited in claim 27, further comprising steering diode means positioned between said capacitor means and said L−R signal control means, in a manner to make said L−R signal control means responsive to both increases and decreases in magnitude of said differentiated signal, whereby said second amplifier means has an increased output related to both increases and decreases in magnitude of the L−R signal component.

29. An apparatus to provide an improved FM stereo output, comprising:
   (a) an input means to provide a first signal input having an L component corresponding to an L signal and an R component corresponding to an R signal, and to provide a second signal input comprising an L+R signal component corresponding to the sum of the L signal and the R signal, and an L−R signal component corresponding to the difference of the L signal and the R signal,
   (b) an output means including an output matrix adapted to receive said L+R signal component and a modified L−R signal component and to combine said L+R and modified L−R signal components at respective sufficiently high levels to produce a first output mode where there is a first output component corresponding more to said L signal and a second output component corresponding more to said R signal so as to be able to provide directional information, and to receive at least said L+R signal at a sufficiently greater level than said L−R signal component to produce a second output mode where said first and second output components both correspond more closely to said L+R signal component,
   (c) output switching means having a first operating condition to receive said L component and said R component from said input means and to transmit these to L and R outputs, respectively, and a second operating condition to receive said first and second output components from the output matrix and transmit these to the L and R outputs,
   (d) leading edge detector means to detect first signal portions where there is a more abrupt change of amplitude and to transmit the L−R signal component of said signal portions at said sufficiently high level to produce said first output mode, and during second signal portions other than said first signal portion to diminish said L−R component relative to said L+R component to produce said second output mode,
   (e) time delay means adapted to receive said L+R signal component and to provide a delayed L+R signal input to said output means,
   (f) time delay control means to control amplitude of said delayed L+R signal input in accordance with relative strength of the L−R signal component in comparison to the L+R signal component,
   (g) control logic means to cause said switching means to operate in either said first condition or said second condition, said control logic means comprising:
      (1) signal strength indicator means responsive to a value related to said input signal in a manner to determine a low signal strength condition where signal strength is below a predetermined signal value,
      (2) multipath distortion indicating means responsive to variations in a value relating to said input signal to indicate a multipath distortion condition where multipath distortion is above a predetermined multipath distortion level, (3) logic output means responsive to said signal strength indicator means and said multipath distortion indicator means to cause said output switching means to be in said first condition where said signal strength is above said predetermined signal level and said multipath distortion is below said predetermined multipath distortion level, and to cause said switching means to be in the second condition when the signal strength is below said predetermined signal strength level or said multipath distortion is above said predetermined multipath distortion level.

30. The apparatus as recited in claim 29, wherein said leading edge detector means is arranged to diminish primarily a higher frequency portion of said L−R signal component during said second signal portions.

31. The apparatus as recited in claim 30, wherein there is a low pass filter to transmit a low frequency portion of said L−R component to said output matrix means, independently of said detector means.

32. The apparatus as recited in claim 31, said leading edge detector means further comprising amplifier means to receive said L−R signal component and to transmit said L−R signal component to said output matrix means, said detector means being responsive to said abrupt change of amplitude to cause said amplifier means to transmit the L−R signal component at a higher level in response to said detector means detecting said abrupt change of amplitude.

33. The apparatus as recited in claim 32, further comprising noise control means connected to said output matrix means in parallel with said amplifier means to transmit said L−R signal component to said matrix means, said noise control means having selectively operable switch means to diminish the L−R signal component delivered by said noise control means so as to be able to diminish noise contributed by said L−R signal component.

34. The apparatus as recited in claim 32, wherein said detector means is responsive primarily to increases in amplitude of said signal to transmit the L−R signal component of said first signal portions at said sufficiently high level.

35. The apparatus as recited in claim 32, wherein said detector means is responsive to both abrupt increases and decreases in the amplitude of the signal to transmit the L−R signal component of the first signal portions at said sufficiently high level.

36. The apparatus as recited in claim 29, wherein said time delay means comprises a first time delay device to produce a first delayed L+R signal input of a shorter delay and a second time delay device to produce a second delayed L+R signal input of a greater delay.

37. The apparatus as recited in claim 36, wherein said time delay means is arranged so that one of said time delay devices produces its delayed input at a higher frequency range of the L+R signal component, and the other time delay device produces the delayed input at a lower frequency portion of the L+R input.

38. The apparatus as recited in claim 37, wherein the first time delay device produces the shorter delayed input at said higher frequency, and the second time delay device produces the longer delayed input at the lower frequency.

39. The apparatus as recited in claim 29, further comprising filter means to receive the delayed input from the time delay means and to diminish a middle frequency portion of said time delayed input relative to low and high frequency portions thereof, so as to provide a modified input which is transmitted to said output means.

40. The apparatus as recited in claim 29, further comprising comparator means to control amplitude of the delayed input in accordance with the amplitude of the L−R signal component relative to the L+R signal component, said comparator comprising:
(a) first means to receive a first input value related to the L+R signal component and to produce a first output value related to a log of the first input value,
(b) second means to receive a second input value related to the L−R signal component and to produce a second output value related a log of said second input value,
(c) third means to subtract the output values from one another and to produce a third output value related to actual value of the ratio of the first and second input values of the first and second means,
(d) fourth means to direct said third output to said time delay control means to increase or decrease amplitude of the delayed input relative to increase or decrease, respectively, of the ratio of the L−R signal component to the L+R signal component.

41. The apparatus as recited in claim 29, wherein said control logic means further comprises a time logic circuit means to initiate a predetermined examination time period and to cause said signal strength indicating means and said multipath distortion indicating means to become operative during said examination time period.

42. The apparatus as recited in claim 41, wherein said time logic circuit means includes muting means to cause sound output of said apparatus to become muted during said examination time period.

43. The apparatus as recited in claim 42, wherein said time logic circuit means is responsive to station change indicating means of said apparatus, in a manner to initiate said examination time period to cause said signal strength indicator means and said multipath distortion indicator means to become activated where there is a change of station input to said apparatus.

44. The apparatus as recited in claim 43, wherein there is muting signal input means responsive to a muting signal of said apparatus to cause said time logic circuit to initiate said examination period in response to a muting signal of said apparatus.

45. The apparatus as recited in claim 44, further comprising a trigger switch means responsive to initiation of operation of said control logic means, to cause said trigger switch means to act on said time logic circuit means to initiate said examiniation time period.

46. The apparatus as recited in claim 41, further comprising a trigger switch means responsive to initiation of operation of said control logic means, to cause said trigger switch means to act on said time logic circuit means to initiate said examiniation time period.

47. The apparatus as recited in claim 29, wherein said leading edge detector means comprises:
(a) capacitor means to receive a value related to said L−R signal component and to transmit a differentiated signal related to rate of change of said L−R signal component,
(b) signal control means responsive to said differentiated signal to produce a control signal related to said differentiated output,
(c) L−R variable transmitting means adapted to transmit said L−R signal component to said output means at a variable output level, and responsive to said control signal to transmit said L−R signal component at a greater or lesser level depending upon magnitude of said differentiated output from said capacitor means.

48. The apparatus as recited in claim 47, wherein said leading edge detector means further comprises rectifying means to receive said L−R signal component and produce a rectified L−R signal value, amplifier means to receive said rectified L−R signal value to produce said value related to said L−R signal component, means providing a circuit path from said amplifier to said signal control means to transmit to said signal control means a value related to absolute magnitude of the value related to the L−R signal component.

49. The apparatus as recited in claim 29, wherein said leading edge detector means comprises:
    (a) rectifying means to receive said L−R signal component and provide a rectified L−R signal,
    (b) a first amplifier means to receive said rectified L−R signal and produce an L−R value output related to said rectified signal,
    (c) capacitor means to receive said L−R value output and to produce a differentiated signal related to rate of change of said L−R value output,
    (d) resistor means bypassing said capacitor to transmit said L−R value output in a path paralleling said capacitor means,
    (e) L−R signal control means to receive said differentiated signal from the capacitor means and said L−R value output from the resistor means and to produce an L−R control signal responsive to said differentiated output and said L−R value output,
    (f) second amplifier means to transmit said L−R signal component to said output means at a variable output level, and responsive to said L−R control signal to transmit said L−R signal component at greater or lesser level depending upon magnitude of said differentiated output of said capacitor means.

50. The apparatus as recited in claim 49, further comprising steering diode means positioned between said capacitor means and said L−R signal control means, in a manner to make said L−R signal control means responsive to both increases and decreases in magnitude of said differentiated signal, whereby said second amplifier means has an increased output related to both increases and decreases in magnitude of the L−R signal component.

51. A method to provide an improved FM stereo output, where there is an L+R signal component corresponding to the sum of an L signal and an R signal, and an L−R signal component corresponding to the difference of the L signal and the R signal, said method comprising:
    (a) providing an input signal made up of said L+R signal component and said L−R signal component;
    (b) detecting from said signal first signal portions where there is a more abrupt change of amplitude,
    (c) during said first signal portions receiving and combining said signal components at respective sufficiently high levels to produce a first output mode where there is first output component corresponding more to said L signal and a second output component corresponding more to said R signal so as to be able to provide directional information to an output means,
    (d) during second signal portions other than said first signal portions, receiving at least said L+R signal at a sufficiently greater level than said L−R signal to produce for said output means a second output mode where said first and second output components both correspond more closely to said L+R signal component.

52. The method as recited in claim 51, further comprising diminishing primarily a higher frequency portion of said L−R signal component during said second signal portions.

53. The method as recited in claim 52, further comprising transmitting a low frequency portion of said L−R component to said output means, during both first and second output modes.

54. The method as recited in claim 51, wherein only increases in amplitude of said signal are detected as abrupt changes in amplitude.

55. The method as recited in claim 51, wherein both abrupt increases and decreases in the amplitude are detected as abrupt changes in amplitude.

56. The method as recited in claim 51, further comprising receiving said L+R signal component and providing a delayed L+R signal input to produce a delayed L+R output from said output means.

57. The method as recited in claim 56, further comprising producing a first delayed L+R signal input of a shorter delay and a second delayed L+R signal input of a greater delay.

58. The method as recited in claim 57, further comprising controlling amplitude of said delayed L+R signal input in accordance with relative signal strength of the L−R signal component in comparison to the L+R signal component.

59. The method as recited in claim 58, wherein one of said delayed inputs is at a higher frequency range of the L+R signal component, and the other delayed input is at a lower frequency portion of the L+R input.

60. The method as recited in claim 59, wherein the first delayed input is at said higher frequency, and the second delayed input is at the lower frequency.

61. The method as recited in claim 56, further comprising controlling amplitude of said delayed L+R signal input in accordance with relative signal strength of the L−R signal component in comparison to the L+R signal component.

62. The method as recited in claim 61, further comprising filtering the delayed input to diminish a middle frequency portion of said delayed input relative to low and high frequency portions thereof, so as to provide a modified input which is transmitted to said output means.

63. The method as recited in claim 61, further comprising controlling amplitude of the delayed input in accordance with the amplitude of the L−R signal component relative to the L+R signal component, by:
    (a) receiving a first input value related to the L+R signal component to produce a first output value related to a log of the first input value,
    (b) receiving a second input value related to the L−R signal component to produce a second output value related a log of said second input value,
    (c) subtracting the output values from one another and to produce a third output value related to actual value of the ratio of the first and second input values of the first and second means,
    (d) directing said third output to increase or decrease amplitude of the delayed input relative to increase or decrease, respectively, of the ratio of the L−R signal component to the L+R signal component.

64. The method as recited in claim 61, further comprising:
(a) detecting a low signal strength condition where signal strength is below a predetermined signal value,
(b) detecting a multipath distortion condition where multipath distortion is above a predetermined multipath distortion level,
(c) when the signal strength is below said predetermined signal strength level or said multipath distortion is above said predetermined multipath distortion level, receiving said signal components to produce said first or second operating modes from said output means.

65. The method as recited in claim 64, further comprising initiating a predetermined examination time period to detect said low signal strength condition or said multipath distortion condition.

66. The method as recited in claim 65, further comprising muting a sound output from said output means during said examination time period.

67. The method as recited in claim 66, further comprising responding to a station change of said L and R signals to initiate said examination time period.

68. The method as recited in claim 67, further comprising responding to a muting signal to initiate said examination period in response to a change of station to change said input signal.

69. A method to provide an improved FM stereo output, comprising:
(a) providing a first signal input having an L component corresponding to an L signal and an R component corresponding to an R signal, providing a second input comprising an L+R signal component corresponding to the sum of the L signal and the R signal, and an L−R signal component corresponding to the difference of the L signal and the R signal,
(b) providing an output means including an output matrix, and receiving said L+R signal component and a modified L−R signal component to combine said L+R and modified L−R signal components at respective sufficiently high levels to produce a first output mode where there is a first output component corresponding more to said L signal and a second output component corresponding more to said R signal so as to be able to provide directional information, and alternatively receiving at least said L+R signal component at a sufficiently greater level than said L−R signal component to produce a second output mode where said first and second output components both correspond more closely to said L+R signal component,
(c) providing switching output means having a first operating condition to receive said L component and said R component from said input means and to transmit these to L and R outputs, respectively, and a second operating condition to receive said first signal input and transmit this to the L and R outputs,
(d) detecting first signal portions where there is a more abrupt change of amplitude and transmitting the L−R signal component of said first signal portions at said sufficiently high level to produce said first output mode, and during second signal portions other than said first signal portion diminishing said L−R component relative to said L+R component to produce said second output mode,
(e) receiving said L+R signal component and providing a delayed L+R signal input to said output means,
(f) controlling amplitude of said delayed L+R signal input in accordance with relative strength of the L−R signal component in comparison to the L+R signal component,
(g) causing said switching means to operate in either said first condition or said second condition, by:
(1) detecting a low signal strength condition where signal strength is below a predetermined signal value,
(2) detecting a multipath distortion condition where multipath distortion is above a predetermined multipath distortion level,
(3) causing said output switching means to be in said first condition where said signal strength is above said predetermined signal level and said multipath distortion is below said predetermined multipath distortion level, and causing said switching means to be in the second condition when the signal strength is below said predetermined signal strength level or said multipath distortion is above said predetermined multipath distortion level.

70. The method as recited in claim 69, further comprising diminishing primarily a higher frequency portion of said L−R signal component during said second signal portions.

71. The method as recited in claim 70, further comprising transmitting a low frequency portion of said L−R component to said output means, during both first and second output modes.

72. The method as recited in claim 69, wherein only increases in amplitude of said signal are detected as abrupt changes in amplitude.

73. The method as recited in claim 69, wherein both abrupt increases and decreases in the amplitude are detected as abrupt changes in amplitude.

74. The method as recited in claim 69, further comprising receiving said L+R signal component and providing a delayed L+R signal input to produce a delayed L+R output from said output means.

75. The method as recited in claim 74, further comprising producing a first delayed L+R signal input of a shorter delay and a second delayed L+R signal input of a greater delay.

76. The method as recited in claim 75, further comprising controlling amplitude of said delayed L+R signal input in accordance with relative signal strength of the L−R signal component in comparison to the L+R signal component.

77. The method as recited in claim 76, wherein one of said delayed inputs is at a higher frequency range of the L+R signal component, and the other delayed input is at a lower frequency portion of the L+R input.

78. The method as recited in claim 77, wherein the first delayed input is at said higher frequency, and the second delayed input is at the lower frequency.

79. The method as recited in claim 74, further comprising controlling amplitude of said delayed L+R signal input in accordance with relative signal strength of the L−R signal component in comparison to the L+R signal component.

80. The method as recited in claim 79, further comprising filtering the delayed input to diminish a middle frequency portion of said delayed input relative to low and high frequency portions thereof, so as to provide a modified input which is transmitted to said output means.

81. The method as recited in claim 79, further comprising controlling amplitude of the delayed input in accordance with the amplitude of the L−R signal component relative to the L+R signal component, by:
(a) receiving a first input value related to the L+R signal component to produce a first output value related to a log of the first input value,
(b) receiving a second input value related to the L−R signal component to produce a second output value related a log of said second input value,
(c) subtracting the output values from one another and to produce a third output value related to actual value of the ratio of the first and second input values of the first and second means,
(d) directing said third output to increase or decrease amplitude of the delayed input relative to increase or decrease, respectively, of the ratio of the L−R signal component to the L+R signal component.

82. An apparatus to provide an improved FM stereo output, comprising:
(a) an input means to provide a first signal input having an L component corresponding to an L signal and an R component corresponding to an R signal, and to provide a second signal input comprising an L+R signal component corresponding to the sum of the L signal and the R signal, and an L−R signal component corresponding to the difference of the L signal and the R signal,
(b) an output means including an output matrix adapted to receive said L+R signal component and a modified L−R signal component and to combine said L+R and modified L−R signal components at respective sufficiently high levels to produce a first output mode where there is a first output component corresponding more to said L signal and a second output component corresponding more to said R signal so as to be able to provide directional information, and alternatively receiving at least said L+R signal component at a sufficiently greater level than said L−R signal component to produce a second output mode where said first and second output components both correspond more closely to said L+R signal component,
(c) output switching means having a first operating condition to receive said L component and said R component from said input means and to transmit these to L and R outputs, respectively, and a second operating condition to receive said first signal input and transmit this to the L and R outputs,
(d) leading edge detector means to detect first signal portions where there is a more abrupt change of amplitude and transmitting the L−R signal component of said first signal portions at said sufficiently high level to produce said first output mode, and during second signal portions other than said first signal portion diminishing said L−R component relative to said L+R component to produce said second output mode,
(e) time delay means adapted to receive said L+R signal component and providing a delayed L+R signal input to said output means,
(f) time delay control means to control amplitude of said delayed L+R signal input in accordance with relative strength of the L−R signal component in comparison to the L+R signal component.

83. The apparatus as recited in claim 82, wherein said leading edge detector means is arranged to diminish primarily a higher frequency portion of said L−R signal component during said second signal portions.

84. The apparatus as recited in claim 83, wherein there is a low pass filter to transmit a low frequency portion of said L−R component to said output matrix means, independently of said detector means.

85. The apparatus as recited in claim 84, said leading edge detector means further comprising amplifier means to receive said L−R signal component and to transmit said L−R signal component to said output matrix means, said detector means being responsive to said abrupt change of amplitude to cause said amplifier means to transmit the L−R signal component at a higher level in response to said detector means detecting said abrupt change of amplitude.

86. The apparatus as recited in claim 85, further comprising noise control means connected to said output matrix means in parallel with said amplifier means to transmit said L−R signal component to said matrix means, said noise control means having selectively operable switch means to diminish the L−R signal component delivered by said noise control means so as to be able to diminish noise contributed by said L−R signal component.

87. The apparatus as recited in claim 85, wherein said detector means is responsive primarily to increases in amplitude of said signal to transmit the L−R signal component of said first signal portions at said sufficiently high level.

88. The apparatus as recited in claim 85, wherein said detector means is responsive to both abrupt increases and decreases in the amplitude of the signal to transmit the L−R signal component of the first signal portions at said sufficiently high level.

89. The apparatus as recited in claim 82, wherein said time delay means comprises a first time delay device to produce a first delayed L+R signal input of a shorter delay and a second time delay device to produce a second delayed L+R signal input of a greater delay.

90. The apparatus as recited in claim 89, wherein said time delay means is arranged so that one of said time delay devices produces its delayed input at a higher frequency range of the L+R signal component, and the other time delay device produces the delayed input at a lower frequency portion of the L+R input.

91. The apparatus as recited in claim 90, wherein the first time delay device produces the shorter delayed input at said higher frequency, and the second time delay device produces the longer delayed input at the lower frequency.

92. The apparatus as recited in claim 82, further comprising filter means to receive the delayed input from the time delay means and to diminish a middle frequency portion of said time delayed input relative to low and high frequency portions thereof, so as to provide a modified input which is transmitted to said output means.

93. The apparatus as recited in claim 82, further comprising comparator means to control amplitude of the delayed input in accordance with the amplitude of the L−R signal component relative to the L+R signal component, said comparator comprising:

(a) first means to receive a first input value related to the L+R signal component and to produce a first output value related to a log of the first input value, (b) second means to receive a second input value related to the L−R signal component and to produce a second output value related a log of said second input value, (c) third means to subtract the output values from one another and to produce a third output value related to actual value of the ratio of the first and second input values of the first and second means, (d) fourth means to direct said third output to said time delay control means to increase or decrease amplitude of the delayed input relative to increase or decrease, respectively, of the ratio of the L−R signal component to the L+R signal component.

94. The apparatus as recited in claim 82, wherein said leading edge detector means comprises:

(a) capacitor means to receive a value related to said L−R signal component and to transmit a differentiated signal related to rate of change of said L−R signal, (b) signal control means responsive to said differentiated signal to produce a control signal related to said differentiated output, (c) L−R variable transmitting means adapted to transmit said L−R signal component to said output means at a variable output level, and responsive to said control signal to transmit said L−R signal component at a greater or lesser level depending upon magnitude of said differentiated output from said capacitor means.

95. The apparatus as recited in claim 94, wherein said leading edge detector means further comprises rectifying means to receive said L−R signal component and produce a rectified L−R signal value, amplifier means to receive said rectified L−R signal value to produce said value related to said L−R signal component, means providing a circuit path from said amplifier to said signal control means to transmit to said signal control means a value related to absolute magnitude of the value related to the L−R signal component.

96. The apparatus as recited in claim 82, wherein said leading edge detector means comprises:

(a) rectifying means to receive said L−R signal component and provide a rectified L−R signal, (b) a first amplifier means to receive said rectified L−R signal and produce an L−R value output related to said rectified signal, (c) capacitor means to receive said L−R value output and to produce a differentiated signal related to rate of change of said L−R value output, (d) resistor means bypassing said capacitor to transmit said L−R value output in a path paralleling said capacitor means, (e) L−R signal control means to receive said differentiated signal from the capacitor means and said L−R value output from the resistor means and to produce an L−R control signal responsive to said differentiated output and said L−R value output, (f) second amplifier means to transmit said L−R signal component to said output means at a variable output level, and responsive to said L−R control signal to transmit said L−R signal component at greater or lesser level depending upon magnitude of said differentiated output of said capacitor means.

97. The apparatus as recited in claim 96, further comprising steering diode means positioned between said capacitor means and said L−R signal control means, in a manner to make said L−R signal control means responsive to both increases and decreases in magnitude of said differentiated signal, whereby said second amplifier means has an increased output related to both increases and decreases in magnitude of the L−R signal component.

* * * * *